United States Patent
Sun et al.

(10) Patent No.: US 9,639,946 B2
(45) Date of Patent: May 2, 2017

(54) IMAGE PROCESSING SYSTEM WITH HYBRID DEPTH ESTIMATION AND METHOD OF OPERATION THEREOF

(71) Applicant: Sony Corporation, Tokyo (JP)

(72) Inventors: Yi Sun, Cincinnati, OH (US); Pingshan Li, Sunnyvale, CA (US)

(73) Assignee: Sony Corporation, Tokyo (JP)

( * ) Notice: Subject to any disclaimer, the term of this patent is extended or adjusted under 35 U.S.C. 154(b) by 174 days.

(21) Appl. No.: 14/644,932

(22) Filed: Mar. 11, 2015

(65) Prior Publication Data

US 2016/0267670 A1    Sep. 15, 2016

(51) Int. Cl.
*G06K 9/00* (2006.01)
*G06T 7/00* (2017.01)

(52) U.S. Cl.
CPC .......... *G06T 7/0065* (2013.01); *G06T 7/0069* (2013.01); *G06T 2207/10016* (2013.01); *G06T 2207/10028* (2013.01); *G06T 2207/10148* (2013.01); *G06T 2207/20021* (2013.01)

(58) Field of Classification Search
None
See application file for complete search history.

(56) References Cited

U.S. PATENT DOCUMENTS

| | | | | |
|---|---|---|---|---|
| 7,711,201 B2* | 5/2010 | Wong | ........................ | G03B 3/02 |
| | | | | 382/254 |
| 8,027,582 B2* | 9/2011 | Li | .......................... | G06T 7/0069 |
| | | | | 348/349 |
| 8,194,995 B2* | 6/2012 | Wong | .................. | H04N 5/23212 |
| | | | | 345/419 |
| 8,280,194 B2* | 10/2012 | Wong | ...................... | G06K 9/209 |
| | | | | 345/660 |
| 8,406,548 B2* | 3/2013 | Ali | .......................... | G06T 5/002 |
| | | | | 382/254 |
| 8,503,801 B2* | 8/2013 | Schiller | ................... | G06T 11/60 |
| | | | | 382/228 |
| 8,624,986 B2* | 1/2014 | Li | ....................... | H04N 5/23212 |
| | | | | 348/208.13 |

(Continued)

OTHER PUBLICATIONS

Chen et al, "Depth Map Generation Based on Depth From Focus", "2010 International Conference on Electronic Devices, Systems and Applications", 2010, pp. 59-63, IEEE, Hsinchu, Taiwan.

(Continued)

*Primary Examiner* — Iman K Kholdebarin
(74) *Attorney, Agent, or Firm* — Haverstock & Owens LLP

(57) ABSTRACT

A system and method of operation of an image processing system includes: a capture image sequence module for receiving an image sequence; a calculate iteration depth map module for calculating an iteration depth map and a zero-crossing array; a calculate median depth map module for calculating a median depth map and a depth difference map; a calculate variance depth map module for calculating a variance depth map; a calculate image depth map module for calculating an image depth map based on the iteration depth map, the zero-crossing array, the median depth map, the depth difference map, and the variance depth map; and a calculate display image module for calculating a display image based on the received images and the image depth map for displaying on a display device.

20 Claims, 15 Drawing Sheets

(56) References Cited

U.S. PATENT DOCUMENTS

| | | | |
|---|---|---|---|
| 8,736,747 B2* | 5/2014 | Li | G02B 7/38 348/349 |
| 8,837,817 B2* | 9/2014 | Papp | G06T 7/0069 382/154 |
| 2008/0175452 A1* | 7/2008 | Ye | G01R 33/561 382/128 |
| 2009/0207288 A1* | 8/2009 | Tanaka | H04N 5/2355 348/294 |
| 2011/0142287 A1* | 6/2011 | Wong | G06T 7/0069 382/106 |
| 2011/0249173 A1 | 10/2011 | Wong et al. | |
| 2012/0236934 A1* | 9/2012 | Chen | H04N 19/597 375/240.03 |
| 2013/0034297 A1* | 2/2013 | Papp | G06T 7/0069 382/154 |
| 2013/0258096 A1 | 10/2013 | Ali et al. | |
| 2014/0022347 A1* | 1/2014 | Liu | G02B 21/367 348/46 |

OTHER PUBLICATIONS

Kim et al, "Real-time Depth Reconstruction from Stereo Sequences", "Three-Dimensional TV, Video, and Display IV", 2005, pp. 60160E-1-60160E-12, vol. 6016, Proceedings of SPIE, Seoul, Korea.

Mahmood et al, "Optimal depth estimation by combining focus measures using genetic programming", "Information Science (2011)", 2010, pp. 1249-1263, vol. 181, Elsevier Inc.

Satoshi A. Sugimoto et al., "Digital composition of images with increased depth of focus considering depth information", Applied Optics, vol. 24, No. 14, Jul. 15, 1985, pp. 2076-2080, Washington, DC, US, ISSN: 0003-6935, DOI: 10.1364/A0.24.002076.

* cited by examiner

ORIGINAL IMAGE
(PICTURE WITH ONE DEPTH)

ORIGINAL IMAGE
(PICTURE WITH ONE DEPTH)

FINAL DEPTH MAP

| SEQUENCE NAME | D1 | D0 | D1-D0 |
|---|---|---|---|
| HANDFAN | 56.1549 | 56 | 0.1549 |
| RUG | 77.4121 | 78 | -0.5879 |
| FENCE_PHOTO_ENTIRE_75CM | 62.3097 | 62 | 0.3097 |
| CARPET2 | 68.8767 | 69 | -0.1233 |
| DOOR | 79.72179235 | 80 | -0.27821 |
| GROUND_OUTDOOR | 66.70077376 | 67 | -0.29923 |
| GROUND_OUTDOOR2 | 69.15486777 | 69 | 0.154868 |
| JACKET2 | 57.59845248 | 57 | 0.598452 |
| JACKET_GRAY | 24.45409401 | 24 | 0.454094 |
| MAGAZINE1 | 52 | 52 | 0 |
| MAGAZINE2 | 16.84513223 | 17 | -0.15487 |
| NOSMOKING_GROUND | 55.15486777 | 55 | 0.154868 |
| POLKADOTS | 31.15486777 | 31 | 0.154868 |
| SCARF1 | 53.84513223 | 54 | -0.15487 |
| SCARF2 | 24 | 24 | 0 |
| TABLE_WOODENSURFACE | 15.25718905 | 15 | 0.257189 |
| WALL_CUBICAL | 54.25718905 | 54 | 0.257189 |
| WALL_OUTDOOR | 36.15486777 | 36 | 0.154868 |
| FENCE_PHOTO_ENTIRE_50CM | 48.69026446 | 49 | -0.30974 |
| FENCE_PHOTO_ENTIRE_100CM | 73.15486777 | 73 | 0.154868 |

IMAGE PROCESSING SYSTEM WITH HYBRID DEPTH ESTIMATION AND METHOD OF OPERATION THEREOF

TECHNICAL FIELD

The present invention relates generally to an image processing system, and more particularly to an image processing system with hybrid depth estimation.

BACKGROUND ART

Modern consumer and industrial electronics, especially devices with a graphical imaging capability, such as cameras, televisions, projectors, cellular phones, and combination devices, are providing increasing levels of functionality to support modern life including three-dimensional display services. Research and development in the existing technologies can take a myriad of different directions.

As users become more empowered with the growth of three-dimensional display devices, new and old paradigms begin to take advantage of this new device space. There are many technological solutions to take advantage of this new display device opportunity. One existing approach is to display three-dimensional images on consumer, industrial, and mobile electronics such as video projectors, televisions, monitors, smart phones, gaming systems, cameras, or a personal digital assistant (PDA).

Three-dimensional image processing systems have been incorporated in cameras, projectors, televisions, notebooks, and other portable products. Today, these systems aid users by capturing and displaying available relevant information, such as diagrams, maps, or videos. The display of three-dimensional images provides invaluable relevant information. Three dimensional images can be formed by capturing stereoscopic images with multiple lenses.

However, displaying information in three-dimensional form has become a paramount concern for the consumer. Displaying a three-dimensional image that does not correlates with the real world decreases the benefit of using the tool.

Thus, a need still remains for better image processing system to capture and display three-dimensional images. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides method of operation of an image processing system, including: receiving an image sequence having received images each having a lens position; forming image pairs having a first image and a second image, the image pairs of the received images in consecutive order for the lens position; partitioning the received images into a grid array having grid blocks; calculating an iteration number for the blur difference between each of the image pairs of the image sequence, the iteration number calculated by iteratively convoluting the second image with a blur kernel until the blur metric of the second image is within a blur difference threshold of the blur metric of the first image; calculating an iteration depth map having an iteration depth for each of the grid blocks of the received images, the iteration depth based on a zero-crossing point for the iteration number; calculating a zero-crossing array having all zero-crossing depths for each of the grid blocks of the image sequence; calculating a median depth map having a median depth for each of the grid blocks by applying a median filter to the iteration depth map; calculating a depth difference map by subtracting the median depth map from the iteration depth map; calculating a variance depth map having a block variance for each of the grid blocks of the received images; calculating an image depth map having an element depth assigned to each of the grid blocks, the element depth based on the iteration depth map, the zero-crossing array, the median depth map, the depth difference map, and the variance depth map; and calculating a display image based on the received images and the image depth map for displaying on a display device.

The present invention provides an image processing system, including: a capture image sequence module for receiving an image sequence having received images each having a lens position and for forming image pairs having a first image, a second image, the image pairs of the received images in consecutive order for the lens position, and for partitioning the received images into a grid array having grid blocks; a calculate iteration depth map module, coupled to the capture image sequence module, for calculating an iteration number for the blur difference between each of the image pairs of the image sequence, the iteration number calculated by iteratively convoluting the second image with a blur kernel until the blur metric of the second image is within a blur difference threshold of the blur metric of the first image, and for calculating an iteration depth map having an iteration depth for each of the grid blocks of the received images, the iteration depth based on a zero-crossing point for the iteration number, and for calculating a zero-crossing array having a zero-crossing depth for each of the grid blocks of the image sequence; a calculate median depth map module, coupled to the calculate iteration depth map module, for calculating a median depth map having a median depth for each of the grid blocks by applying a median filter to the iteration depth map and for calculating a depth difference map by subtracting the median depth map from the iteration depth map; a calculate variance depth map module, coupled to the calculate median depth map module, for calculating a variance depth map having a block variance for each of the grid blocks of the received images; a calculate image depth map module, coupled to the calculate variance depth map module, for calculating an image depth map having an element depth assigned to each of the grid blocks, the element depth based on the iteration depth map, the zero-crossing array, the median depth map, the depth difference map, and the variance depth map; and a calculate display image module, coupled to the calculate image depth map module for calculating a display image based on the received images and the image depth map for displaying on a display device.

Certain embodiments of the invention have other steps or elements in addition to or in place of those mentioned above. The steps or element will become apparent to those skilled in the art from a reading of the following detailed description when taken with reference to the accompanying drawings.

BRIEF DESCRIPTION OF THE DRAWINGS

FIG. 21 is an example of a scene depth variance table.

BEST MODE FOR CARRYING OUT THE INVENTION

Figure 1:
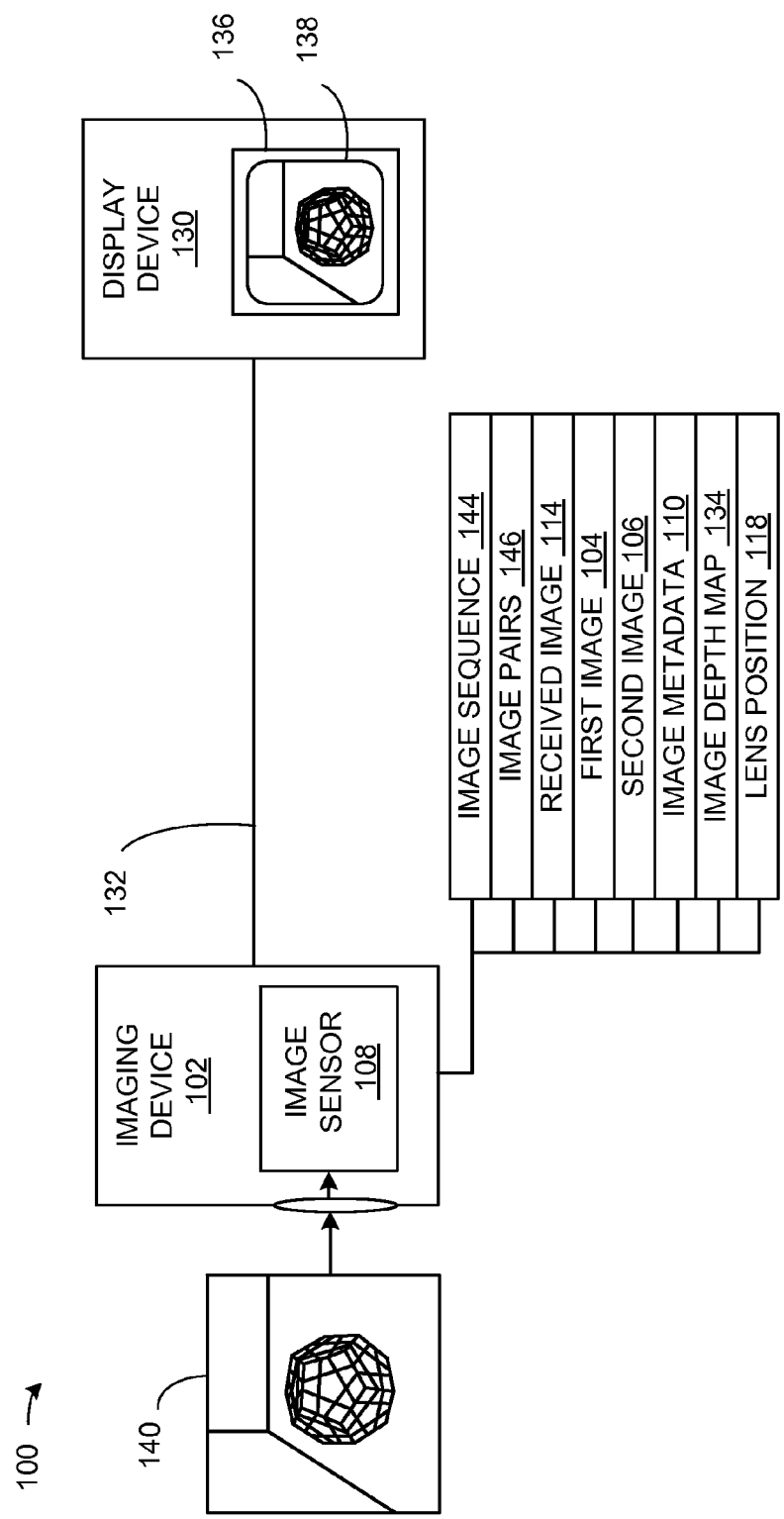
FIG. 1 is an image processing system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The same numbers are used in all the drawing FIGs. to relate to the same elements. The embodiments have been numbered first embodiment, second embodiment, etc. as a matter of descriptive convenience and are not intended to have any other significance or provide limitations for the present invention.

The term "image" is defined as a pictorial representation of an object. An image can include a two-dimensional image, three-dimensional image, video frame, a calculated file representation, an image from a camera, a video frame, or a combination thereof. For example, the image can be a machine readable digital file, a physical photograph, a digital photograph, a motion picture frame, a video frame, an x-ray image, a scanned image, or a combination thereof. The image can be formed by pixels arranged in a rectangular array. The image can include an x-axis along the direction of the rows and a y-axis along the direction of the columns.

The horizontal direction is the direction parallel to the x-axis of an image. The vertical direction is the direction parallel to the y-axis of an image. The diagonal direction is the direction non-parallel to the x-axis and non-parallel to the y-axis.

The term "module" referred to herein can include software, hardware, or a combination thereof. For example, the software can be machine code, firmware, embedded code, and application software. Also for example, the hardware can be circuitry, processor, calculator, integrated circuit, integrated circuit cores, or a combination thereof.

Referring now to FIG. 1, therein is shown examples of an image processing system 100 in an embodiment of the present invention. The image processing system 100 can receive an image sequence 144 of received images 114 at an imaging sensor 108 in an imaging device 102.

The received images 114 are pictures formed on the imaging sensor 108. The received images 114 of the image sequence 144 can form image pairs 146 each having a first image 104 and a second image 106. Each of the received images 114 can be captured at a different lens position.

The image processing system 100 can capture the first image 104 and the second image 106 in a variety of ways. For example, the first image 104 and the second image 106 can be formed by sequentially capturing a source image 140 of a physical scene with the imaging sensor 108.

Each of the received images 114 can include image metadata 110. The image metadata 110 is information about the associated image. For example, the image metadata 110 can include information about the physical properties of the image processing system 100 when the received images 114 were created. In another example, the image metadata 110 can be the picture information recorded with the digital image in a digital camera.

The image metadata 110 can include a variety of information. For example, the image metadata 110 can include photographic properties, imaging device orientation, lens information, aperture information, device location, optical parameters, settings, light levels, lens information, or a combination thereof.

The image metadata 110 can include a lens position 118 for each of received images 114 of the image sequence 144. The lens position 118 is the distance from the lens to the imaging sensor 108.

The received images 114 of the image sequence 144 can be transferred within the image processing system 100 to a display device 130 over a communication link 132. The display device 130 is a unit capable of displaying a display image 138 on a display unit 136. For example, the display device 130 can be a handheld device with a liquid crystal display unit for viewing images, a monitor, a projector, a touchscreen, a light emitting diode (LED) display, or a combination thereof.

The image processing system 100 can include an image depth map 134. The image depth map 134 is information describing the distance from points on an image to the image processing system 100. The image depth map 134 can be used to form the display image 138, such as a 3-dimensional image, for display on the display device 130.

The communication link 132 is a mechanism for transferring information. For example, the communication link 132 can be an internal computer bus, an inter-device bus, a network link, or a combination thereof. Although the image processing system 100 and the display device 130 are depicted as separate devices, it is understood that the image processing system 100 and the display device 130 may be implemented as a single integrated device.

Figure 2:
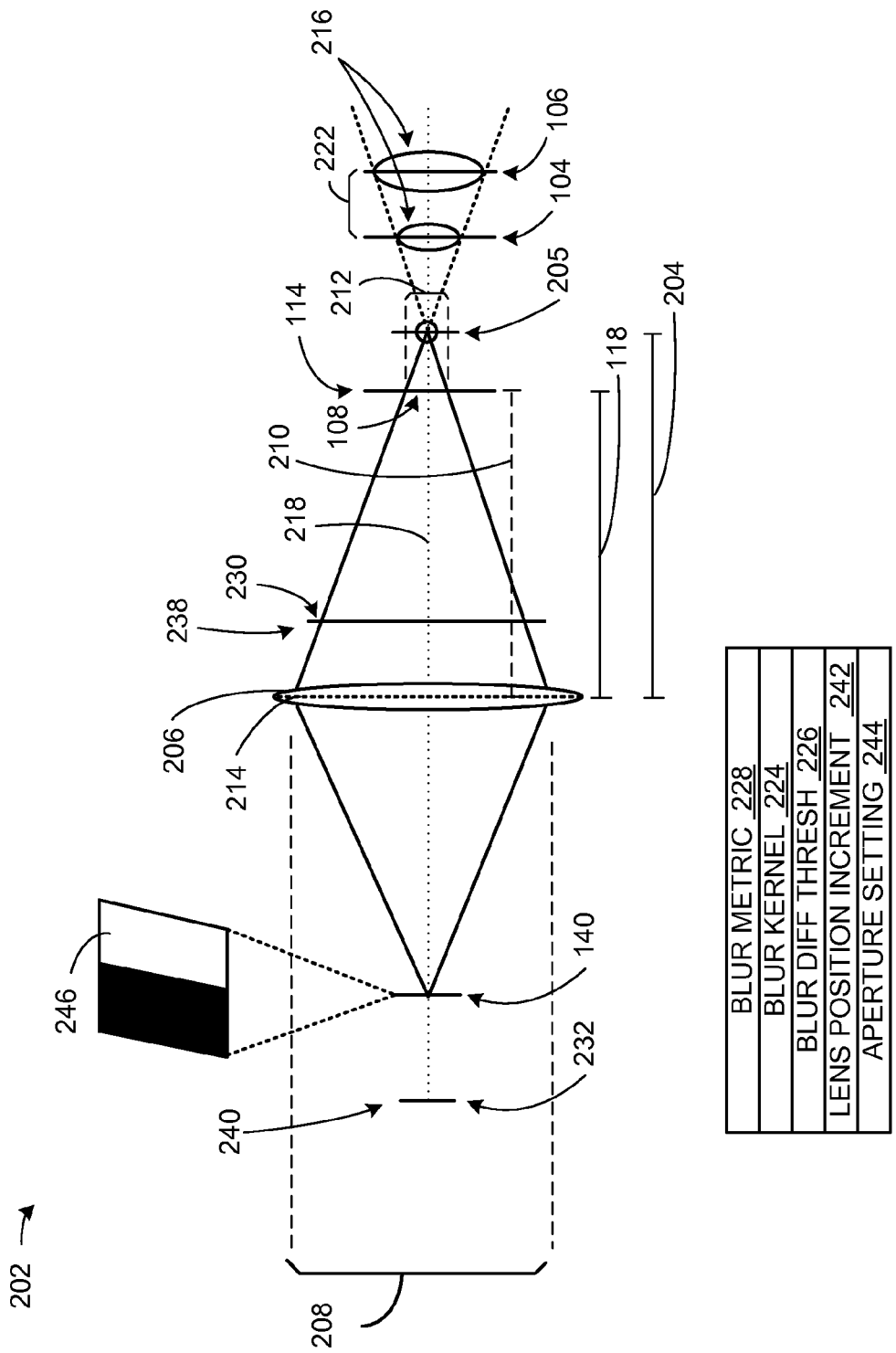
FIG. 2 is an example of an optical system.

Referring now to FIG. 2, therein is shown an example of an optical system 202. The optical system can include the source image 140, a lens 206 having the lens position 118, and the imaging sensor 108 for receiving the received images 114. The received images 114 are all images received at the imaging sensor 108 and can include the first image 104, the second image 106, a first calibration image, a second calibration image, or a combination thereof.

The source image 140 is an optical representation of a scene. For example, the source image 140 can be a calibration target image, a point source, an object, a pattern image, a geometric pattern, or a combination thereof.

In a further example, the source image 140 can be a step edge image 246. The step edge image 246 is a reference image having one side black and one side white.

The received images 114 are the representation of the source image 140 at the imaging sensor 108. The light from the source image 140 passes through the lens 206 to form the received images 114.

The lens 206 is an optical element for transmitting and refracting light. The lens 206 can be for converging or diverging light.

The lens 206 can have a variety of configurations. For example, the lens 206 can be a simple lens having a single optical element. In another example, the lens 206 can be a compound lens having an array of multiple simple lenses.

The lens 206 can be formed from a variety of materials. For example, the lens 206 can be formed from glass, plastic, liquid, or other transparent materials. In another example, the lens 206 can be formed from Fresnel elements.

The lens 206 can have a lens diameter 214 and an aperture setting 244. The lens diameter 214 is the maximum distance from one side of the lens 206 to the opposite side. The aperture setting 244 is the size of an opening where light can pass through the lens 206. The aperture setting 244 can determine an aperture diameter 208. The aperture diameter 208 is the size of the opening to the lens 206. The aperture diameter 208 is equal to or smaller than the lens diameter 214.

The lens 206 can have a lens focal length 204. The lens focal length 204 is the distance between the lens 206 and a focus point 205 of the lens 206. The focus point 205 is the point where the lens 206 is in focus.

The optical system 202 can include a lens focus position 210. The lens focus position 210 is the distance between the lens 206 and the imaging sensor 108. The lens 206 can be moved along a focal path 218 by changing the lens focus position 210.

The optical system 202 can include a minimum focal length 230. The minimum focal length 230 is the closest distance that the lens 206 can form a sharp image. The optical system 202 can include a maximum focal length 232. The maximum focal length 232 is an effective infinity distance.

The source image 140 is in focus when one of the received images 114 is sharpest and has the highest contrast. When one of the received images 114 is out of focus and less sharp, it will have a lower contrast. The first image 104 can be taken with a smaller aperture, as indicated by a higher f-number, and generally be sharper than the second image 106.

The optical system 202 can have a depth of field 216. The depth of field 216 is the range of distances where an image is sharp. The depth of field 216 can be the measure of the tolerance of the placement of the image plane in relation to the lens 206.

Each of the received images 114 can have a blur metric 228. The blur metric 228 is a measure of the degree of blurriness of the image. The received images 114 formed at the focus point 205 for the lens 206 are considered in focus and do not have a degree of blurriness. The received images 114 can have a value of zero for the blur metric 228 at the focus point.

The first image 104 and the second image 106 of one of the image pairs 146 of FIG. 1 can be separated by a blur difference 222 of FIG. 2. The blur difference 222 is a measurement of the change in the level of blur between the two images. The blur difference 222 can measure the change in the blur metric 228 between the two images. The blur metric 228 can be calculated for an entire image or a portion of the image.

The blur metric 228 of an image can be determined in a variety of ways. For example, the blur metric 228 can be calculated by determining the mean square error of the pixels of the image.

In another example, the blur can be measured by comparing a blur radius 212 of a target image at a given focal distance from the lens 206. The blur radius 212 is the size of a circle formed by an out-of-focus image of the source image 140, where the source image 140 has a point source or a step edge image.

In illustrative example, the image processing system 100 can capture two images, the first image 104 and the second image 106, each having different values for the lens position 118. The first image 104 and the second image 106 can be used to form the image depth map 134 of FIG. 1 based on the blur metric 228 of the two images.

The blur difference 222 between the first image 104 and the second image 106 is the difference in the blur metric 228 used to measure the level of defocus of an image. The blur difference 222 can be modeled by a point spread function P from the first lens position to the second lens position with the equation:

$$A1*P=A2 \qquad (1)$$

where the asterisk * operator indicate the operation of a two dimensional convolution. The point spread function P can be approximated using a series of convolutions by a blur kernel 224, designated as K, as follows:

$$P=K*K*\ldots *K \qquad (2)$$

The blur kernel 224 can have various values. It is understood that the values, size, and dimensionality of the blur kernel 224 are exemplary and can be different that as described below. For example, the blur kernel 224 can be a 3×3 matrix have a high center value with lower edge values such as:

$$\begin{pmatrix} 1 & 2 & 1 \\ 2 & 5 & 2 \\ 1 & 2 & 1 \end{pmatrix} \qquad (3)$$

The blur kernel 224 can implement a variety of functions. For example, the blur kernel 224 can function as a low pass filter, a high pass filter, an impulse filter, or a combination thereof.

The blur difference 222 between the first image 104 and the second image 106 of one of the image pairs 146 can be measured by the number of convolution in Equation 2. The blur difference 222 is calculated iteratively by applying the blur kernel 224 to each of the images and calculating a mean square value for each of the images. The iterative convolution process can continue until the blur difference 222 between the first image 104 and the second image 106 are within a blur difference threshold 226.

The image pairs 146 can be used to determine the characteristics of the blur difference 222 of the lens 206 for different lens position values. The characteristics of the blur difference 222 for the lens 206 can be compared to the blur difference 222 of the first image 104 and the second image 106 to determine the depth.

The lens position 118 can vary from a start position 238 to an end position 240 in increments of the lens position increment 242. The start position 238 can correspond to the minimum focal length 230. The end position 240 can correspond to the maximum focal length 232.

Figure 3:
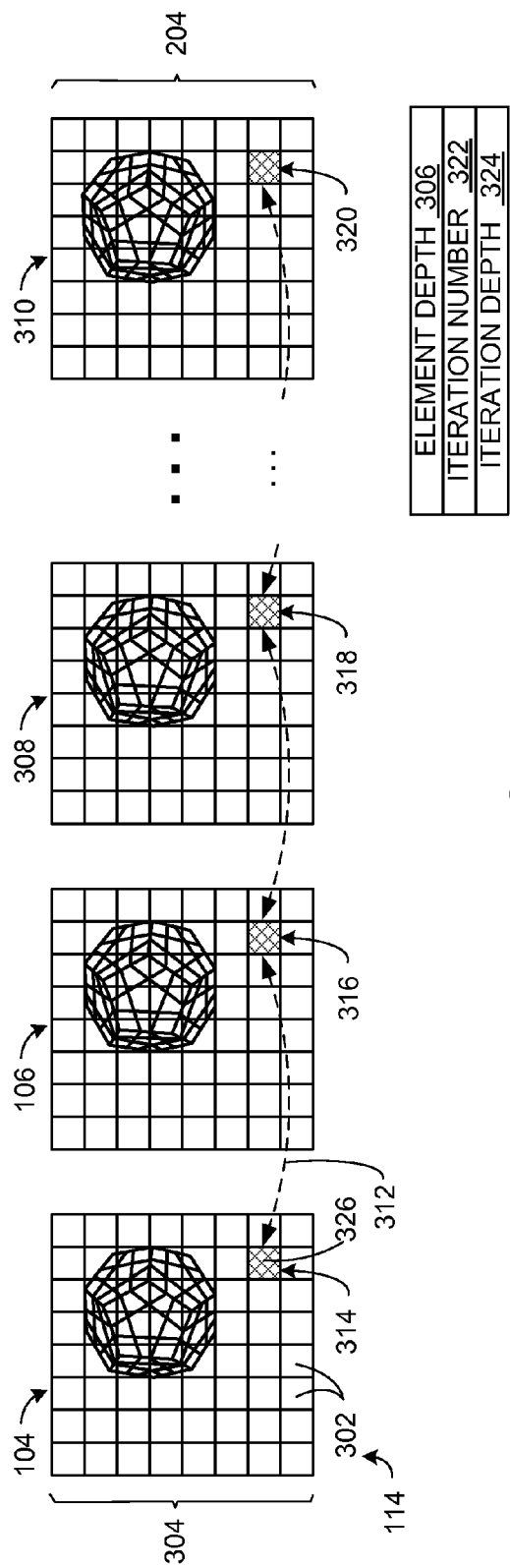
FIG. 3 is an example of the image sequence.

Referring now to FIG. 3, therein is shown an example of the image sequence 144. The image sequence 144 is a series of the received images 114. The image sequence 144 can be a set of sequential, consecutive images.

The received images 114 can be divided up into a grid array 304 of grid blocks 302. The grid array 304 is an image divided into a grid configuration. The grid blocks 302 are sub-pictures that make up the received images 114.

Each of the grid blocks 302 can be a rectangular array of pixels. For example, the grid blocks 302 can have dimensions of 16×16 pixels, 32×32 pixels, or other regular rectangular dimensions.

Each of the received images 114 of the image sequence 144 can have a different value for the lens position 118 of FIG. 1. For example, the image sequence 144 can include a series of images taken with the values of the lens position 118 ranging from the minimum focal length 230 of FIG. 2 to the maximum focal length 232 for the lens 206 of FIG. 2.

The image sequence 144 can have a number of the received images 114. For example, the image sequence 144 can include the first image 104, the second image, a third image 308, and a final image 310.

The image sequence 144 can include sets of corresponding blocks 312. The corresponding blocks 312 are grid blocks 302 in the same position for all of the images in the image sequence 144. Each of the corresponding blocks 312 can represent one of the grid blocks 302 for each value of the lens position 118. For example, the corresponding blocks 312 can include a first block 314, a second block 316, a third block 318, and a final block 320.

Although the corresponding blocks 312 can have identifiers such as first, second, third, and last, the names of the corresponding blocks are exemplary and do not suggest or imply a physical ordering or priority. For example, the first block 314 and the second block 316 can represent any two consecutive images within the image sequence 144.

Each of the corresponding blocks 312 of one of the image pairs 146 can be separated by the blur difference 222 of FIG. 2. The blur difference 222 is the difference in the level of blurriness of each of the images. The blur difference 222 can be measured in terms of an iteration number 322. The iteration number 322 is calculated using iterative convolution using the blur kernel 224 of FIG. 2, such as a Gaussian kernel. An iteration depth 324 can be the position of the zero-crossing point associated with the iteration number 322.

The pixels in the second block 316 can be convoluted with the blur kernel 224 until the blur metric 228 of FIG. 2 for each of the corresponding blocks 312 is within the blur difference threshold 226 of FIG. 2. The blur metric 228 is a measure of blurriness. For example, the blur metric 228 can be the mean square error for one of the grid blocks 302 of the received images 114.

Each of the grid blocks 302 of one of the received images 114 can have an element depth 306. The element depth 306 is the distance between the lens 206 of FIG. 2 and the object represented by one of the grid blocks 302 of one of the received images 114.

The received images 114 can include a target block 326. The target block 326 is one of the grid blocks 302 that has been selected for processing. The target block 326 can be associated with the corresponding blocks 312 in other images in the image sequence 144.

The lens position 118 can be adjusted from the start position 238 of FIG. 2 to the end position 240 of FIG. 2 in units of the lens position increment 242 of FIG. 2. For example, the start position 238 can correspond to the position for the minimum focal length 230 of FIG. 2 and the end position 240 can correspond to the position for the maximum focal length 232.

Figure 4:
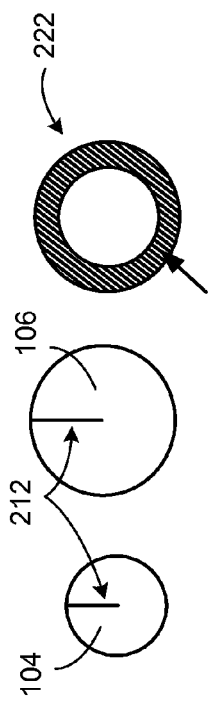
FIG. 4 is an example of the blur difference.

Referring now to FIG. 4, therein is shown an example of the blur difference 222. The blur difference 222 can be the change in the blur metric 228 of FIG. 2 for one of the grid blocks 302 of FIG. 3 between the first image 104 and the second image 106.

The blur difference 222 can be expressed the number of iterations required match the blur metric 228 of the other image. The blur difference 222 can be shown as:

$$g1 * k = g2 \qquad (4)$$

where k is a Gaussian kernel, g1 is the first image 104, and g2 is the second image 106.

The measurement of the blur difference 222 using the standard deviation cannot be used because $\sigma_1 + \sigma_k \neq \sigma_2$, where $\sigma$ is the standard deviation of the blur radius. Instead, the variance can be used based on $\sigma_1^2 + \sigma_k^2 = \sigma_2^2$.

The blur difference 222 can be expressed in a variety of ways. For example, for a given target image in the source image 140 of FIG. 1, such as a circle, the first image 104 can have a target size with the blur radius 212 at one value. The second image 106 can have the target size with the blur radius 212 at a different value. The blur difference 222 can be measured as the difference in area between the two circles defined by the two values for the blur radius 212.

Figure 5:
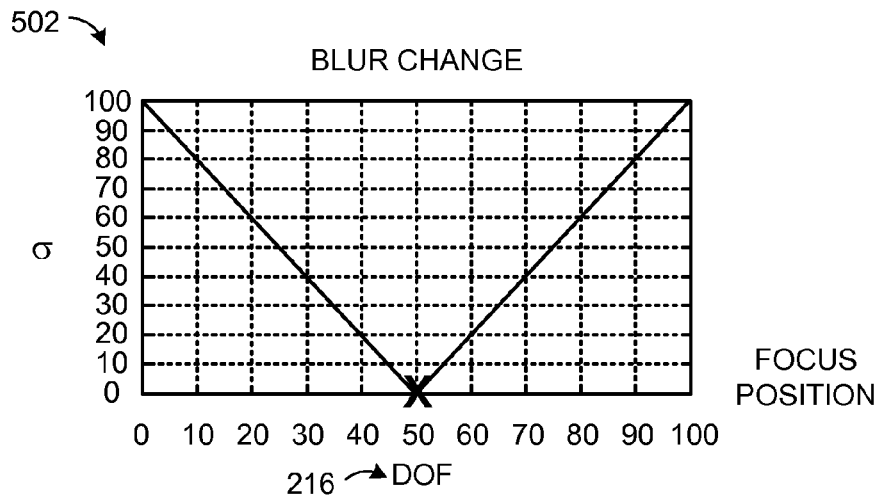
FIG. 5 is an example of a blur change chart.

Referring now to FIG. 5, therein is shown an example of a blur change chart 502. The blur change chart 502 shows the change in the degree of blur between two of the image pairs 146 of FIG. 1 expressed in term of the number of depth of field 216 (DOF) and the standard deviation on the vertical axis. The blur difference 222 of FIG. 2 is zero at the focal point of the lens 206 of FIG. 2. The y-axis represents the sample point in terms of DOF. The x-axis represents the standard deviation of the blur radius, in terms of pixels or other measurement units.

Figure 6:
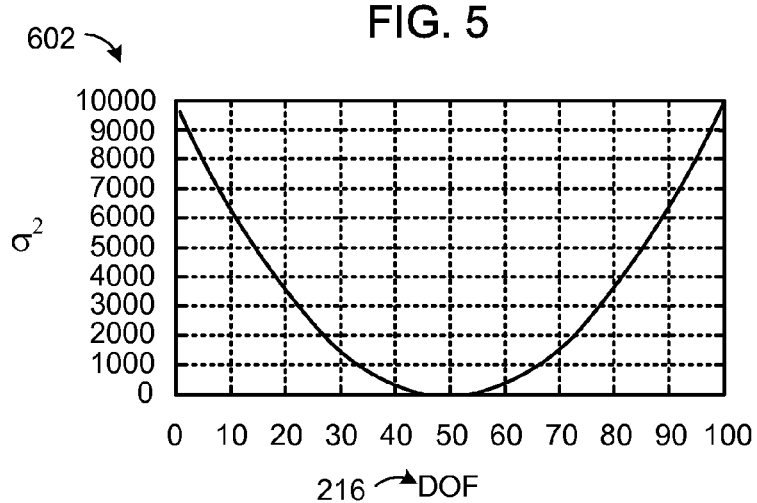
FIG. 6 is an example of a blur variance chart.

Referring now to FIG. 6, therein is shown an example of a blur variance chart 602. The blur variance chart 602 shows the parabolic curve representing the variance expressed in terms of the number of depth of field 216. The y-axis represents the sample point in terms of DOF. The x-axis represents the square of the blur radius, or variance, in terms of the square of pixels or other measurement units.

Figure 7:
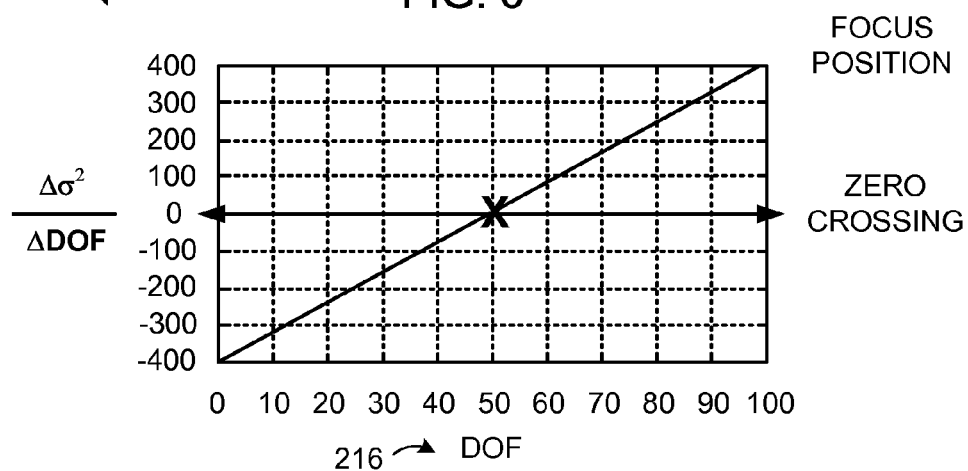
FIG. 7 is an example of a blur difference chart.

Referring now to FIG. 7, therein is shown an example of a blur difference chart 702. The blur difference chart 702 shows the variation in the iteration number 322 of FIG. 3 of the blur difference 222 of FIG. 2 between the corresponding blocks 312 of FIG. 3 of the two images of one of the image pairs 146 as a function of the depth of field 216.

The value of the iteration number 322 can indicate the relative sharpness of the grid blocks 302. A negative value for the iteration number 322 can indicate that the second image 106 is sharper than the first image 104. A positive value for the iteration number can indicate the second image 106 is blurrier than the first image 104.

Figure 8:
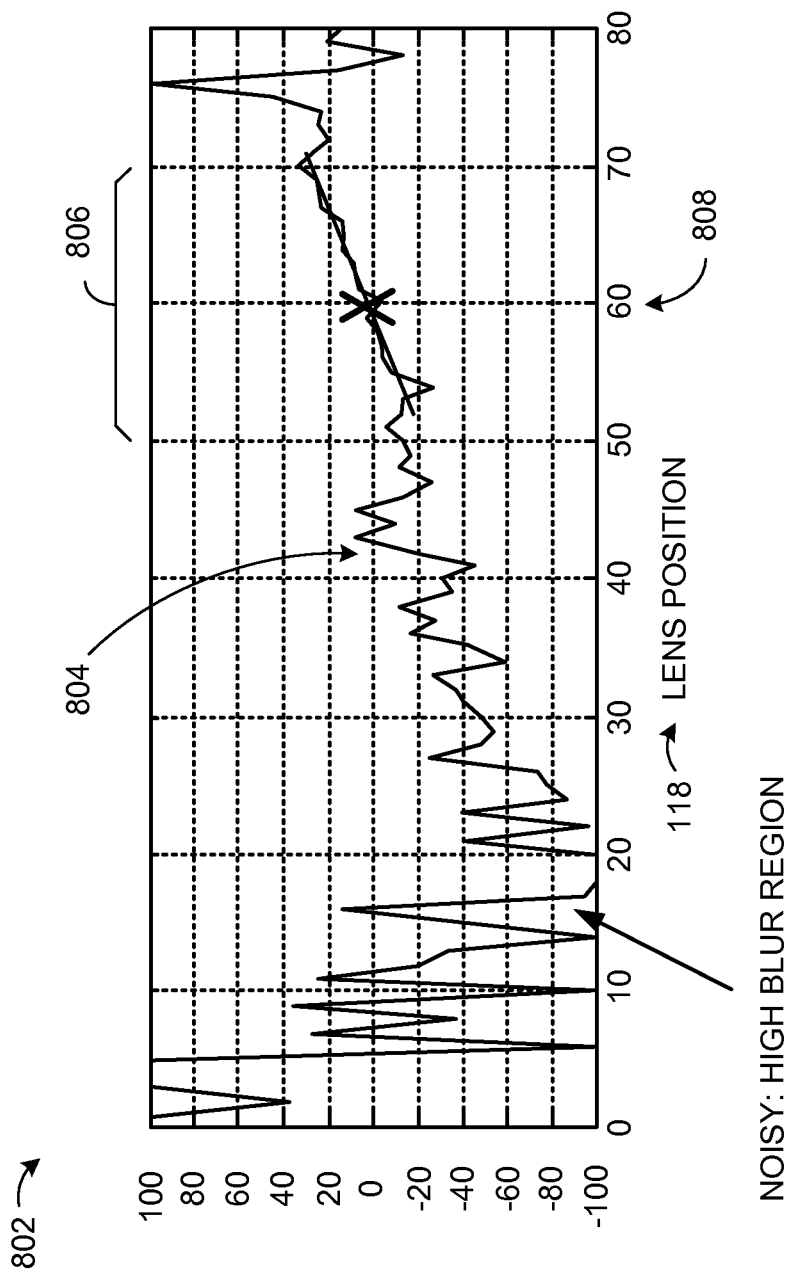
FIG. 8 is an example of an iteration curve chart.

Referring now to FIG. 8, therein is shown an example of an iteration curve chart 802. The iteration curve chart 802 shows an iteration curve 804 for one of the grid blocks 302 of FIG. 3 over the range of the lens position 118. The iteration curve 804 shows the relationship between the iteration number 322 of FIG. 3 for one of the image pairs 146 of FIG. 1 and the lens position 118.

The iteration curve chart 802 can include a linear region 806 around the lens position 118 corresponding to the focus point 205 of FIG. 2 of the lens 206 of FIG. 2. The linear region 806 is an area around the focus point 205 that can be modelled with a linear equation. The linear region 806 can indicate that the data can be fitted with a linear equation over a range of at least 3 DOF. The linear region 806 can be wider than 3 DOF. There is no expected range and different images can have different ranges.

The iteration curve chart 802 can include high blur regions that have wide variation in the relationship between the iteration number 322 and the lens position 118. The high blur regions can be found at the lower and upper ends of the iteration curve 804. The high blur regions can include zero-crossing data points that do not indicate the presence of the focus point 205.

The iteration curve 804 can be calculated by determining the iteration number 322 between consecutive sets of the image pairs 146 across the entire range of the lens position 118 for the image sequence 144 of FIG. 1. The image processing system 100 of FIG. 1 can capture the image sequence 144. The image sequence 144 can include a number of separate images, such as between fifty and one hundred images. The number of images in the image sequence 144 can be based on the camera and the lens. In operation, the number of images can be fixed if the camera and lens are fixed and the corresponding parameters, such as aperture, are also fixed.

Each of the images can be partitioned into the grid array 304 of FIG. 3 having the grid blocks 302. Each of the grid blocks 302 is a rectangular subset of pixels, such as a 16×16 pixel block, a 32×32 pixel block, or another regularly sized pixel block.

The iteration number 322 can be calculated for each of the corresponding blocks 312 of FIG. 3 in each of the image pairs 146 of the image sequence 144. The iteration number 322 is calculated using iterative convolution using the blur kernel 224 of FIG. 2, such as a Gaussian kernel. The pixels one of the grid blocks 302 can convoluted with the blur kernel 224 until the blur metric 228 of FIG. 2 for each of the corresponding blocks 312 is within the blur difference threshold 226 of FIG. 2. The blur metric 228 is the measure of blurriness, such as the mean square error for one of the grid blocks 302.

For each of the grid blocks 302, the iteration curve 804 can be formed to show the difference in the iteration number 322 for the consecutive images in the image pairs 146 of the image sequence 144 as the lens position 118 varies. The lens position 118 associated with the zero-crossing point of the iteration curve 804 can be a zero-crossing depth 808 of the selected one of the grid blocks 302. The zero-crossing depth 808 is an estimate of the distance from the lens 206 to the objects represented in one of the grid blocks 302.

Figure 9:
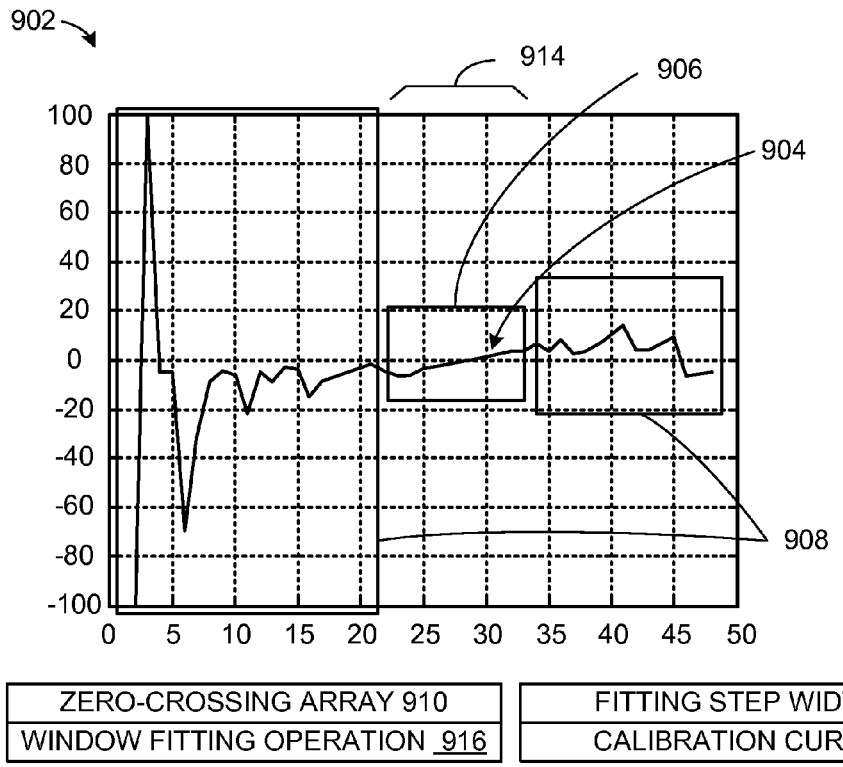
FIG. 9 is an example of window fitting.

Referring now to FIG. 9, therein is shown an example of window fitting. A window fitting chart 902 can be used to show the region around the focus point 205 of FIG. 2 where the iteration curve 804 of FIG. 8 can be modelled by a linear equation. A window fitting operation 916 can be used to identify the zero-crossing point 904 of the iteration curve 804 for each of the grid blocks 302 of FIG. 3 of the image sequence 144 of FIG. 1.

The window fitting chart 902 can include high blur regions 908 and the linear region 806 of FIG. 8. The high blur regions 908 represent areas on the iteration curve chart 802 that are noisy regions that cannot be modelled accurately with a linear equation. The high blur regions 908 can be at the upper and lower ranges for the lens position 118 of FIG. 1. The linear region 806 is an area around the focus point 205 that can be modelled with a linear equation.

The window fitting operation 916 can determine the linear region 806 by moving a fitting window 906 along the x-axis by intervals of a fitting step width 912 where the fitting window 906 has a window width 914. The fitting window 906 is an area on the iteration curve chart 802 that can be checked for the zero-crossing point 904. The fitting window 906 is moved along the x-axis until the end of the iteration curve 804.

At each interval step, the fitting window 906 can be analyzed to determine if the fitting window 906 includes the zero-crossing point 904. If so, then the zero-crossing point 904 information is stored in a zero-crossing array 910. The data in the zero-crossing array 910 can be analyzed with linear regression to determine the parameters of the linear equation for the iteration curve 804.

When doing linear regression, the gradient can be fixed as a calibration curve 918 by identifying the fitting window 906 having the smallest mean square error of the original data compared to the fitted data. The zero-crossing depth 808 of FIG. 8 for the selected one of the grid blocks 302 can be the value of the lens position 118 associated with the zero-crossing point 904.

For different images, the length of the fitting window 906 can be different. For example, the length of the fitting window 906 can be 3 DOF, 5 DOF, or 7 DOF. However, it is understood that other values of DOF can be used.

The window fitting operation can be performed by calculating the gradient of the fitting curve, correcting the fitting curve's gradient using the calibration curve, changing the intercept until the mean square error is minimized between the fitting curve and the original data, and then check if the zero-crossing point exists or not.

It has been found that using the zero-crossing point 904 to determine the element depth 306 of FIG. 3 for one of the grid blocks 302 of the image sequence 144 can increase flexibility. By providing an alternative depth measure, the accuracy of the element depth 306 can be estimated.

It has been found that using the zero-crossing point 904 to determine the zero-crossing depth 808 for one of the grid blocks 302 of the image sequence 144 can improve accuracy. The zero-crossing point 904 for the fitting window 906 can provide an additional value for the element depth 306 to help establish the accuracy of the element depth 306 for one of the grid blocks 302.

Figure 10:
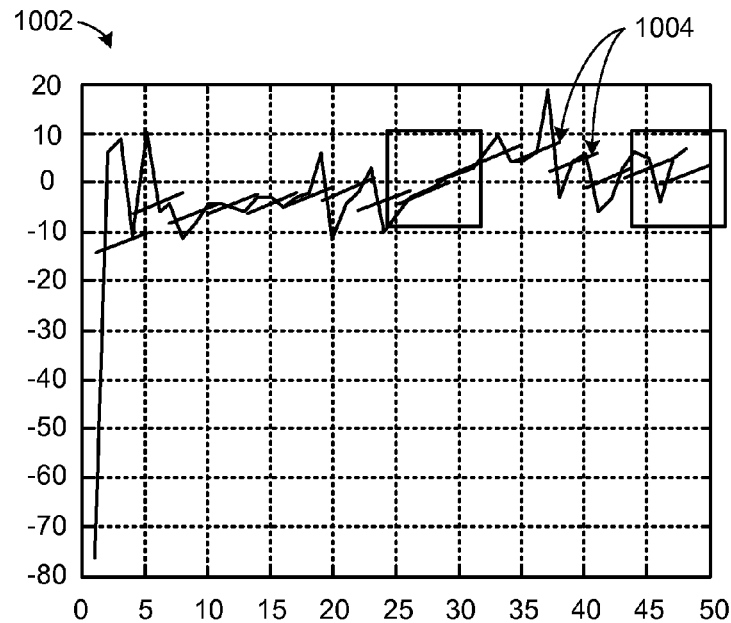
FIG. 10 is an example of a window fitting error analysis chart.

Referring now to FIG. 10, therein is shown an example of a window fitting error analysis chart 1002. The window fitting error analysis chart 1002 can show the linear approximations of fitting curves 1004 for various point along the iteration curve 804 of FIG. 8. The fitting curves 1004 are the linear approximations of the iteration curve 804 at a portion of the linear region 806 of FIG. 8. The zero-crossing point 904 of FIG. 9 of one of the fitting curves 1004 can indicate the lens position 118 of FIG. 1 of the focus point 205 of FIG. 2.

Figure 11:
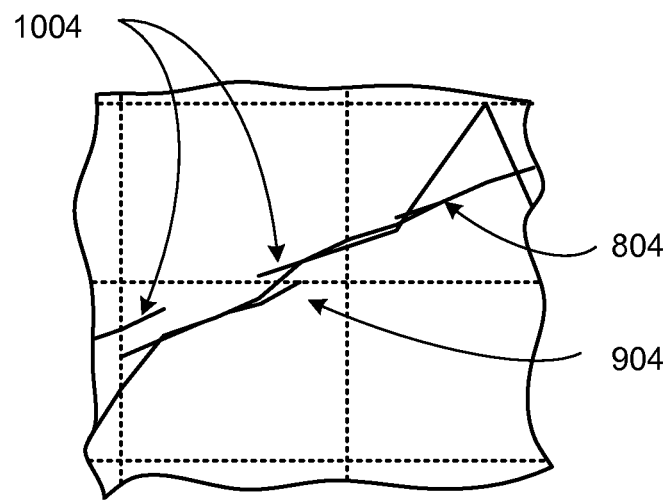
FIG. 11 is an example of a correct depth for the window fitting error analysis chart.

Referring now to FIG. 11, therein is shown an example of a correct depth for the window fitting error analysis chart 1002 of FIG. 10. In the linear region 806 of FIG. 8, the fitting curves 1004 can have similar slope values. The position of the fitting curves 1004 can align with one another and set of the fitting curves 1004 can be modelled by a single linear equation. The fitting curves 1004 can model the iteration curve 804 in the linear region 806. The zero-crossing point 904 of the iteration curve 804 can indicate the element depth 306 of FIG. 3 for one of the grid blocks 302 of FIG. 3.

Figure 12:
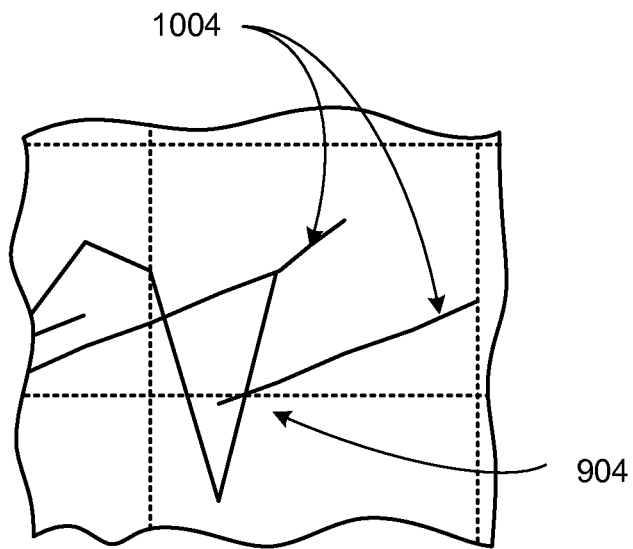
FIG. 12 is an example of an incorrect depth for the window fitting error analysis chart.

Referring now to FIG. 12, therein is shown an example of an incorrect depth for the window fitting error analysis chart 1002 of FIG. 10. In the high blur regions 908 of FIG. 9, the fitting curves 1004 cannot be accurately modelled with a linear equation. Because of the offset between the fitting curves 1004 the zero-crossing point 904 is not at the correct depth position.

Figure 13:
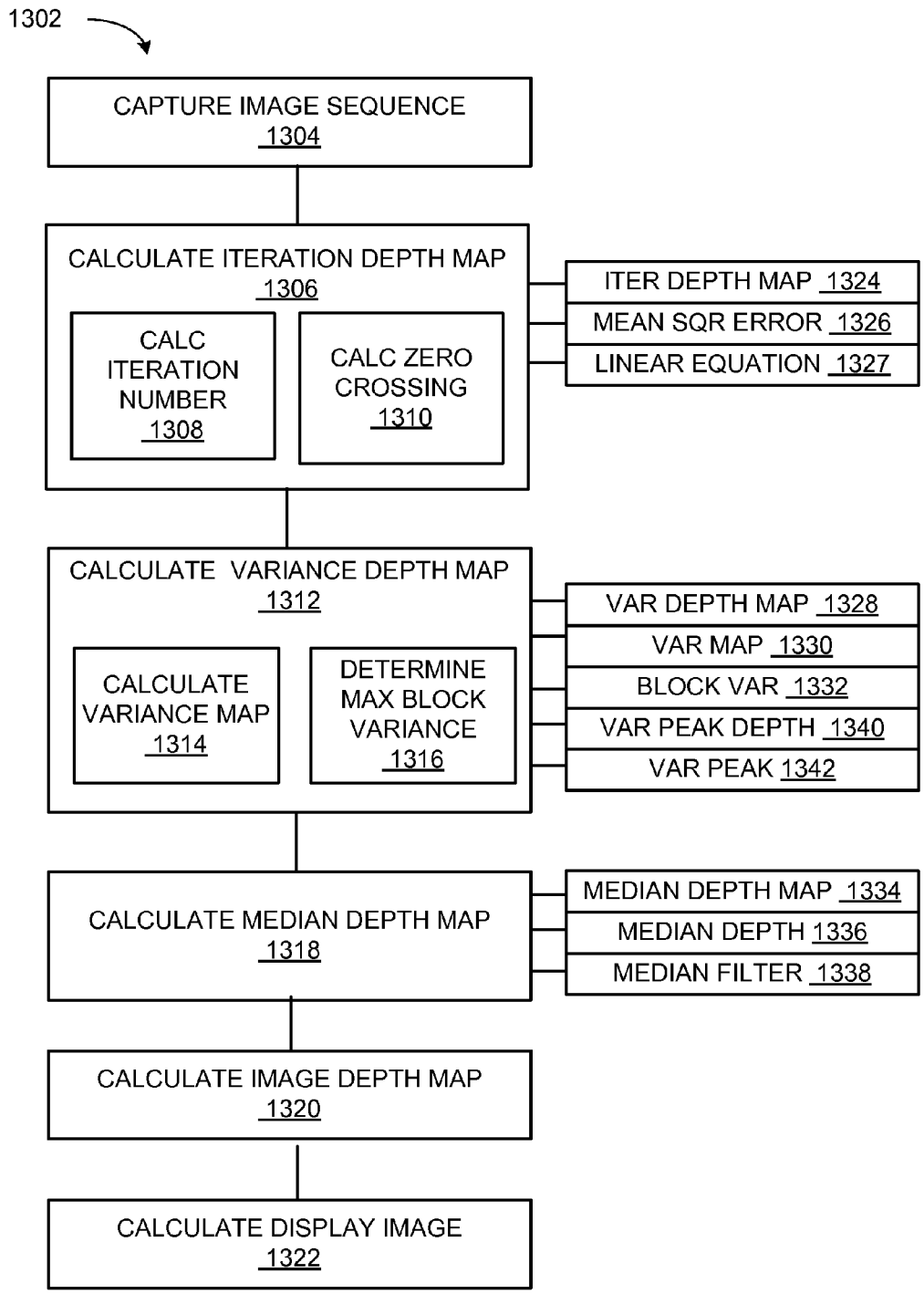
FIG. 13 is an example of a process flow of the image processing system with hybrid depth estimation.

Referring now to FIG. 13, therein is shown an example of a process flow 1302 of the image processing system 100 of FIG. 1 with hybrid depth estimation. The image processing system 100 can include a capture image sequence module 1304, a calculate iteration depth map module 1306, a calculate iteration number module 1308, a calculate zero-crossing module 1310, a calculate variance depth map module 1312, a calculate variance map module 1314, a determine maximum block variance module 1316, a calculate median depth map module 1318, a calculate image depth map module 1320, and a calculate display image module 1322.

The capture image sequence module 1304 can acquire the received images 114 of FIG. 1 of the image sequence 144 of FIG. 1 at a different value for the lens position 118 of FIG. 1. Each of the received images 114 can be captured sequentially while changing the lens position 118 of FIG. 1 from the start position 238 of FIG. 2 to the end position 240 of FIG. 2. The lens position 118 can be incremented by the lens position increment 242 of FIG. 2 between each of the received images 114.

The calculate iteration depth map module 1306 can calculate an iteration depth map 1324 for the image sequence 144. The iteration depth map 1324 can includes the iteration depth 324 for each of the grid blocks 302 based on the zero-crossing point 904 on the iteration number 322 of the blur difference 222 between each of the image pairs 146 of the image sequence 144. The iteration depth 324 of FIG. 3 can be refined using the window fitting operation to identify the element depth 306 of FIG. 3 represented by the lens position 118 of the zero-crossing point 904 of FIG. 9 for the iteration curve 804 of FIG. 8 of each of the grid blocks 302 of FIG. 3. The calculate iteration depth map module 1306 can include the calculate iteration number module 1308 and the calculate zero-crossing module 1310. After the calculate iteration depth map module 1306 completes, the control flow can pass to the calculate variance depth map module 1312.

For the entire iteration curve chart 802 of FIG. 8, a window fitting operation 916 can divide the iteration curve 804 into pieces. The pieces can overlap if the fitting window 906 of FIG. 9 is smaller than the window-width 914 of FIG. 9.

For each piece of the iteration curve 804, linear regression can be applied to fit the data with a linear equation 1327. The linear equation is an equation approximating the iteration curve 804 in the linear region 806 of FIG. 8 determined using linear regression. The linear equation 1327 can be checked to determine if the linear equation defines an intersection with the x-axis and includes the zero-crossing point 904. If the zero-crossing point 904 is present, then the mean square error can be calculated for the difference between the data of the linear equation and the original data of the iteration curve 804 for each of the image pairs 146 of the image sequence 144.

For the set of the mean square error 1326 for each of the image pairs 146 of the image sequence 144, the minimum of the mean square error 1326 can be determined and the position of the zero-crossing point 904 can be the iteration depth 324 of FIG. 3. The iteration depth 324 can be added to the zero-crossing array 910. After iterating over the entire iteration curve 804, each block in the image sequence 144 can be assigned the zero-crossing point 904 or be assigned a null values indicating the lack of the zero-crossing in the zero-crossing array 910.

The calculate iteration number module 1308 can determine the iteration number 322 of FIG. 3 for each of the grid blocks 302 of each of the image pairs 146 of the image sequence 144. The calculate iteration number module 1308 can form the zero-crossing array 910 of FIG. 9 and form the iteration depth map 1324.

The calculate iteration number module 1308 can calculate the iteration number 322 for each of the image pairs 146 in the image sequence 144. The iteration number 322 represent the number of iterative convolution operations required to bring the blur metric 228 of FIG. 2 of one of the images of one of the image pairs 146 to within the blur difference threshold 226 of FIG. 2 of the other image of one of the image pairs 146.

The iteration number 322 for each of the grid blocks 302 can form the iteration depth map 1324 showing the relationship between the iteration number 322 and the iteration depth 324. The iteration depth 324 is the distance represented by the lens position 118 for image pairs 146 of the image sequence 144. The iteration depth 324 is the estimated distance from the lens 206 of FIG. 2 to the objects represented in one of the grid blocks 302. After the iteration depth map 1324 has been formed, the control flow can pass to the calculate zero-crossing module 1310.

The calculate zero-crossing module 1310 can find the zero-crossing point 904 for each of the grid blocks 302 over the image sequence 144. For each of the grid blocks 302 where the iteration curve 804 includes the zero-crossing point 904, the corresponding value of the lens position 118 is the zero-crossing depth 808 of FIG. 8 that can be entered into the zero-crossing array 910.

The zero-crossing module 1310 can perform the window fitting operation 916 to partition the iteration curve 804 into pieces to identify a relatively linear portion that can be modeled with a linear equation. The relatively linear portion is approximately linear over at least 3 DOF. If the linear region 806 modelled with the linear equation crosses the x-axis, then the zero-crossing point 904 can be determined at the intersection with the x-axis. The mean square error 1326 can then be determined for the difference between the data of the linear equation and the original data of the iteration curve 804 for each of the image pairs 146 of the image sequence 144.

The minimum of the mean square error 1326 for each of the image pairs 146 of the image sequence 144 can then be identified. The zero-crossing point 904 for the minimum of the mean square error 1326 can represent the iteration depth 324 for one of the grid blocks 302. The iteration depth 324 for each of the grid blocks 302 can then be added to the zero-crossing array 910. After iterating over the entire iteration curve 804, each of the grid blocks 302 in the image sequence 144 can be assigned the zero-crossing point 904 or be assigned a null value indicating the lack of zero-crossing indicated in the zero-crossing array 910.

The zero-crossing array 910 can then be used to show if one of the grid blocks 302 includes the zero-crossing point 904. The zero-crossing array 910 can have a blank entry for the grid blocks 302 that do not have the zero-crossing point 904. The presence of the zero-crossing depth 808 in the zero-crossing array 910 indicates that the zero-crossing point 904 exists.

The zero-crossing array 910 for each of the grid blocks 302 can be determined by identifying the zero-crossing point 904 within the linear region 806 of FIG. 8 of the iteration curve 804. The zero-crossing array 910 can include the zero-crossing depth 808 associated with the zero-crossing point 904. After completion, the control flow can pass to the calculate variance depth map module 1312.

The calculate variance depth map module 1312 can calculate a variance depth map 1328 for the image sequence 144. The variance depth map 1328 can be a representation of the variance of the grid blocks 302 versus the lens position 118. The calculate variance depth map module 1312 can include the calculate variance map module 1314 and the determine maximum block variance module 1316.

The variance depth map 1328 is based on a variance map 1330. The variance map 1330 can have a block variance 1332 for each of the grid blocks 302, where the block variance 1332 is the variance of the pixels in the selected one of the grid blocks 302. After completion, the control flow can pass to the determine maximum block variance module 1316.

The determine maximum block variance module 1316 can form the variance depth map 1328 by determining the maximum value of the block variance 1332 for each of the grid blocks 302 across the image sequence 144. The maximum value of the block variance 1332 is a variance peak 1342. The variance peak 1342 is associated with the variance peak depth 1340 that can provide an approximation of the lens position 118 corresponding to distance from the lens 206 to the objects shown in the target block 326 of FIG. 3. The variance depth map 1328 can have the variance peak depth 1340 for each of the grid blocks 302. After completion, the control flow can pass to the calculate median depth map module 1318.

The calculate median depth map module 1318 can calculate a median depth map 1334 by applying a median filter 1338 to the iteration depth map 1324. The median filter 1338 is an operation to calculate the median for one of the grid blocks 302. The median depth map 1334 can include a median depth 1336 for each of the grid blocks 302. The median depth 1336 can be calculated by determining the median value for each of the grid blocks 302.

The calculate median depth map module 1318 can calculate a depth difference map 1344. The depth difference map 1344 is the difference between the iteration depth map 1324 and the median depth map 1334. The depth difference map 1344 can be calculated by subtracting the values of the median depth map 1334 from the values of the iteration depth map 1324. The depth difference map 1344 can indicate a measure of quality for the iteration depth map 1324.

The depth difference map 1344 can have a depth difference 1346 for each of the grid blocks 302. The depth difference 1346 can be the difference between values of the median depth map 1334 and the values of the iteration depth map 1324 for each of the grid blocks 302. The depth difference 1346 for one of the grid blocks 302 can be compared against a depth threshold 1348 to measure the quality of the iteration depth map 1324. The depth threshold 1348 is a measure of distance expressed in terms of the depth of field 216. For example, the depth threshold 1348 can have a value of 0.5 DOF. After completion, the control flow can pass to the calculate image depth map module 1320.

The calculate image depth map module 1320 can calculate the image depth map 134 of FIG. 1 based on the iteration depth map 1324, the zero-crossing array 910, the variance depth map 1328, and the median depth map 1334. The image depth map 134 can be formed by selecting the appropriate value for the element depth 306 from the individual depth maps based on the values within the depth maps.

The calculate display image module 1322 can combine one of the received images 114 with the image depth map 134 to create the display image 138 of FIG. 1 for displaying on the display device 130 of FIG. 1. The display image 138 can be a 2D representation of 3D space within the captured region from the direction of camera.

Figure 14:
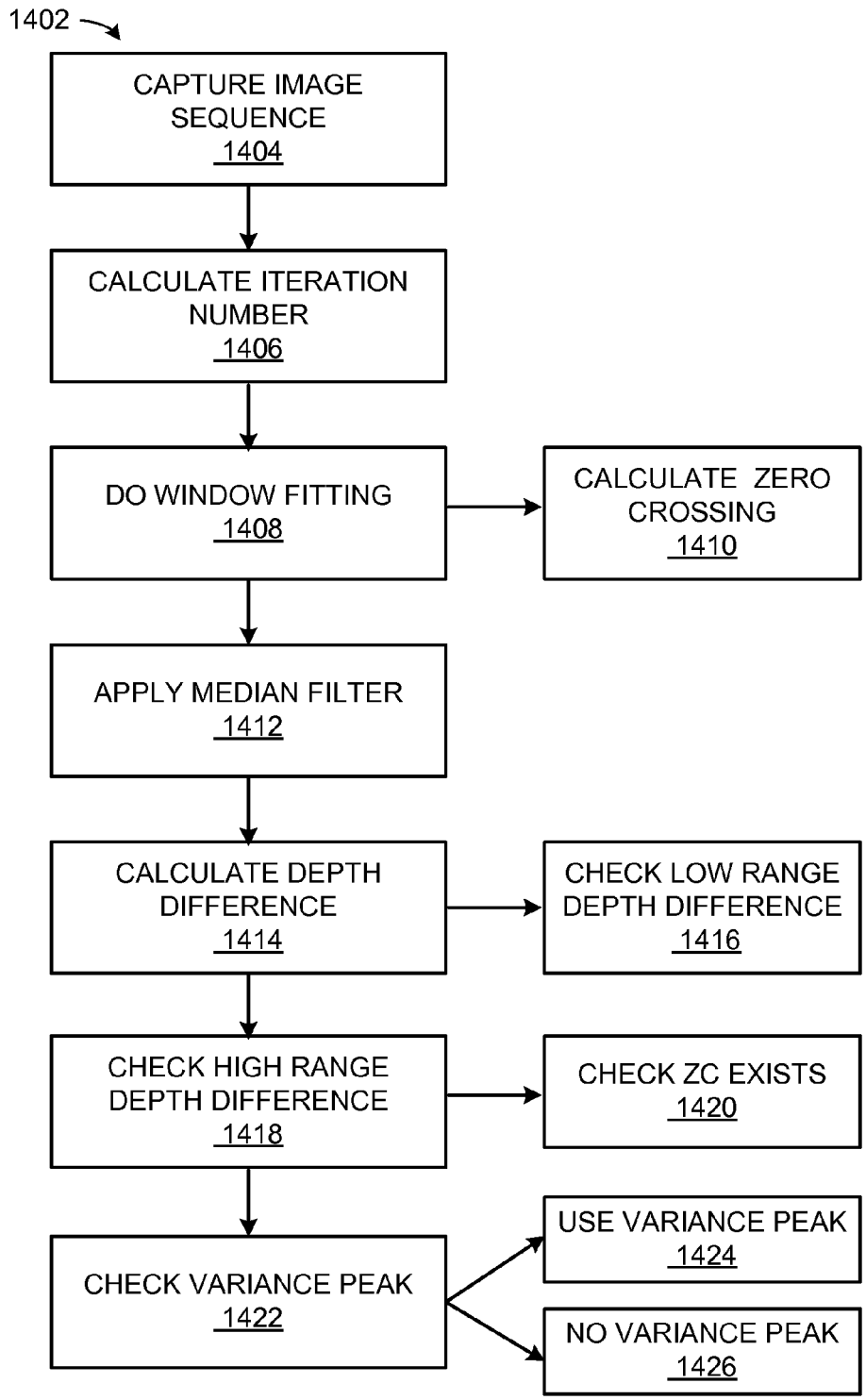
FIG. 14 is an example of a flow chart of the image processing system with hybrid depth estimation.

Referring now to FIG. 14, therein is shown an example of a flow chart of the image processing system 100 with hybrid depth estimation. The flow chart shows exemplary steps for calculating the image depth map 134 of FIG. 1. The flow chart can include a capture image sequence step 1404, a calculate iteration number step 1406, a do window fitting step 1408, a calculate zero-crossing step 1410, an apply median filter step 1412, a calculate depth difference step 1414, a check low range depth difference step 1416, a check high range depth difference step 1418, a check zero-crossing step 1420, a check variance peak step 1422, a use variance peak step 1424, and a no variance peak step 1426.

The image processing system 100 can capture the image sequence 144 of FIG. 1 in the capture image sequence step 1404. The received images 114 of FIG. 1 of the image sequence 144 can be captured with the lens position 118 of FIG. 1 ranging from the start position 238 of FIG. 2 to the end position 240 of FIG. 2 in intervals of the lens position increment 242. Each two consecutive images can form the image pairs 146 of FIG. 1 of the image sequence 144. The image sequence 144 can include a number of the received images 114. For example, the image sequence 144 can include between fifty to one hundred of the received images 114. In another example, the image sequence 144 can have ninety-five images. The number of images in the image sequence 144 is exemplary and it is understood that the number of images in the image sequence 144 can be varied based on engineering or data requirements.

The capture image sequence step 1404 can partition each of the received images 114 into the grid array 304 of FIG. 3 having the grid blocks 302 of FIG. 3. The grid blocks 302 of one of the received images 114 can have the corresponding blocks 312 of FIG. 3 in another of the received images 114. After completion, the control flow can pass to the calculate iteration number step 1406.

The image processing system 100 can calculate the iteration number 322 of FIG. 3 for each of the grid blocks 302 of the image sequence 144 in a calculate iteration number step 1406. The iteration number 322 is a measure of the blur difference 222 of FIG. 2 between two of the images of the image sequence 144. The iteration number 322 is calculated for each of the grid blocks 302 of each of the received images 114 of the image sequence 144.

The image processing system 100 can step through the set of the image pairs 146 of FIG. 1 of the image sequence 144 and calculate the blur difference 222 in terms of the iteration number 322. The iteration number 322 can be calculated for each of the grid blocks 302 of each pairs of images. Each of the images of the image sequence 144 are taken at sequential values of the lens position 118 beginning with the start position 238 and ending at the end position 240.

The iteration number 322 can be calculated for each of the grid blocks 302 in each of the image pairs 146 of the image sequence 144. The iteration number 322 is calculated using iterative convolution using the blur kernel 224 of FIG. 2. For example, the blur kernel 224 can be a Gaussian kernel.

One of the grid blocks 302 can be convoluted with the blur kernel 224 until the blur metric 228 of FIG. 2 for each of the corresponding blocks 312 is within the blur difference threshold 226 of FIG. 2. For each of the grid blocks 302, the iteration curve 804 of FIG. 8 can be formed to show the difference in the iteration number 322 for the consecutive images in the image pairs 146 of the image sequence 144 as the lens position 118 varies. The iteration depth map 1324 can be formed using the zero-crossing position from iteration number 322 for each of the grid blocks 302 for each of the images of the image sequence 144. After completion, the control flow can pass to the do window fitting step 1408.

The image processing system 100 can form the iteration depth map 1324 in the do window fitting step 1408. The image processing system 100 can calculate the zero-crossing point 904 of FIG. 9 for each of the grid blocks 302 of the image sequence 144 using the window fitting operation 916 of FIG. 9. The window fitting operation 916 can determine the portions of the iteration curve 804 that can be modelled with a linear equation and the portions that cannot be modelled with a linear equation.

By determining where the iteration curve 804 is relatively linear and flat, the zero-crossing point 904 can be detected where the linear equation 1327 of FIG. 13 has a value of zero on Y-axis. The lens position 118 associated with the zero-crossing point 904 can be the element depth 306 of FIG. 3 of the selected one of the grid blocks 302 for the iteration depth map 1324. After completion, the control flow can pass to the calculate zero-crossing step 1410.

The image processing system 100 can calculate the zero-crossing array 910 of FIG. 9 by determining the presence of the zero-crossing point 904 for each of the grid blocks 302 for the image sequence 144 in the calculate zero-crossing step 1410. Some of the grid blocks 302 will not have the zero-crossing point 904 in the linear region 806 of FIG. 8 of the iteration curve 804. The zero-crossing array 910 can show the presence and corresponding value of the lens position 118 for the zero-crossing point 904 of each of the grid blocks 302. After completion, the control flow can pass to the apply median filter step 1412.

The image processing system 100 can calculate the median depth map 1334 of FIG. 13 in the apply median filter step 1412. The image processing system 100 can apply the median filter 1338 of FIG. 13 to the iteration depth map 1324 to generate the median depth map 1334. The median filter 1338 can calculate the median depth 1336 for each of the grid blocks 302. The median depth 1336 of FIG. 13 can be calculated by determining the median value for the depth value of the grid block 302 and the grid blocks 302 directly above, below, left and right of it. For example, the grid blocks 302 in the 3, 6, 9 and 12 o'clock directions. After completion, the control flow can pass to the calculate depth difference step 1414.

The image processing system 100 can calculate the depth difference map 1344 in a calculate depth difference step 1414. The depth difference map 1344 can be calculated by subtracting the entries of the median depth map 1334 from the iteration depth map 1324. The depth difference 1346 can calculate the difference between the values of the median depth map 1334 and the values of the iteration depth map 1324 for each of the grid blocks 302. The depth difference map 1344 can indicate the correlation between the iteration depth map 1324 is from the median depth map 1334.

The image processing system 100 can check if the depth difference map 1344 entry for one of the grid blocks 302 is below the depth threshold 1348 in the check low range depth difference step 1416. If the difference between the median depth map 1334 and the iteration depth map 1324 is less than 0.5 of the depth of field 216 of FIG. 2, then the selected one of the grid blocks 302 in the image depth map 134 can have the element depth 306 set to the corresponding value in the iteration depth map 1324.

The image processing system 100 can check if the depth difference map 1344 entry for one of the grid blocks 302 is greater than or equal the depth threshold 1348 in the check high range depth difference step 1418. If the depth difference map 1344 entry indicates the difference between the median depth map 1334 and the iteration depth map 1324 is greater than or equal to the depth threshold 1348 of 0.5 of the depth of field 216, then the control flow can pass to the check zero-crossing step 1420.

The check zero-crossing step 1420 can search the zero-crossing array 910 to determine if the selected one of the grid blocks 302 contains the zero-crossing point 904. If the zero-crossing point 904 exists within ±1 DOF of the median depth map 1334 value, then the depth for the zero-crossing point 904 can be assigned to the element depth 306 for the selected one of the grid blocks 302 in the image depth map 134.

The check variance peak step 1422 can search for the variance peak 1342 of FIG. 13 for the selected one of the grid blocks 302 in the variance depth map 1328 of FIG. 13. If the variance peak 1342 exists within plus or minus two units of the depth of field 216 of the median depth map 1334, then the depth associated with the variance peak 1342 can be assigned as depth for the target block 326 of FIG. 3 in the use variance peak step 1424. If the variance peak 1342 does not exist, then the control flow can pass to the no variance peak step 1426.

The no variance peak step 1426 can assign the element depth 306 from the iteration depth map 1324 as the element depth 306 for the image depth map 134. The image processing system 100 can iterate over all of the grid blocks 302 of the images of the image sequence 144 until the image depth map 134 is completely populated.

Figure 15:
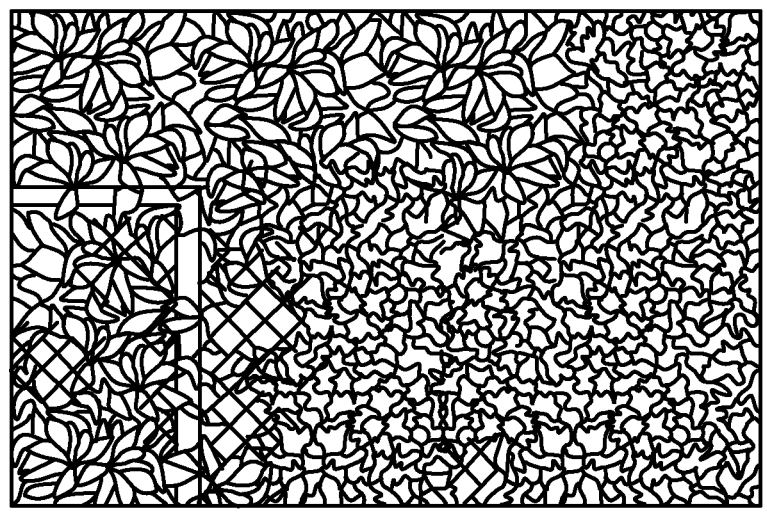
FIG. 15 is an example of the source image with one depth.

Referring now to FIG. 15, therein is shown an example of the source image 140 with one depth. The source image 140, such as a fence covered with leaves, can be primarily one depth, the depth from the lens 206 of FIG. 2 to the fence covered with leaves.

Figure 16:
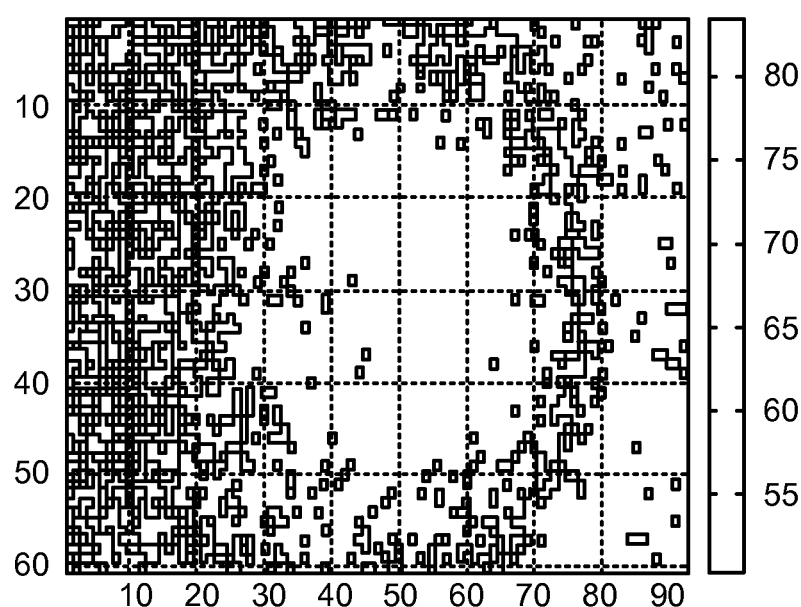
FIG. 16 is an example of the image depth map for the source image with one depth.

Referring now to FIG. 16, therein is shown an example of the image depth map 134 for the source image 140 of FIG. 1 with one depth. The image depth map 134 can show only minor variation between the element depth 306 of FIG. 3 for each of the grid blocks 302 of FIG. 3 of the received images 114 of FIG. 1.

Figure 17:
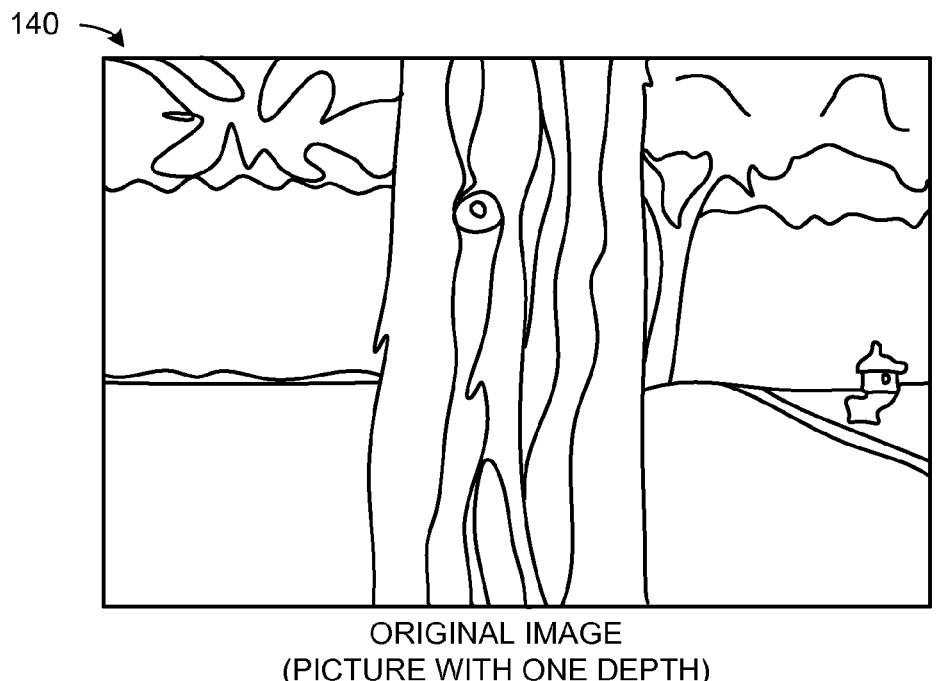
FIG. 17 is an example of the source image with varying depth.

Referring now to FIG. 17, therein is shown an example of the source image 140 with varying depth. The source image 140, such as a tree in a foreground with a landscape in the background, can have varying depth.

Figure 18:
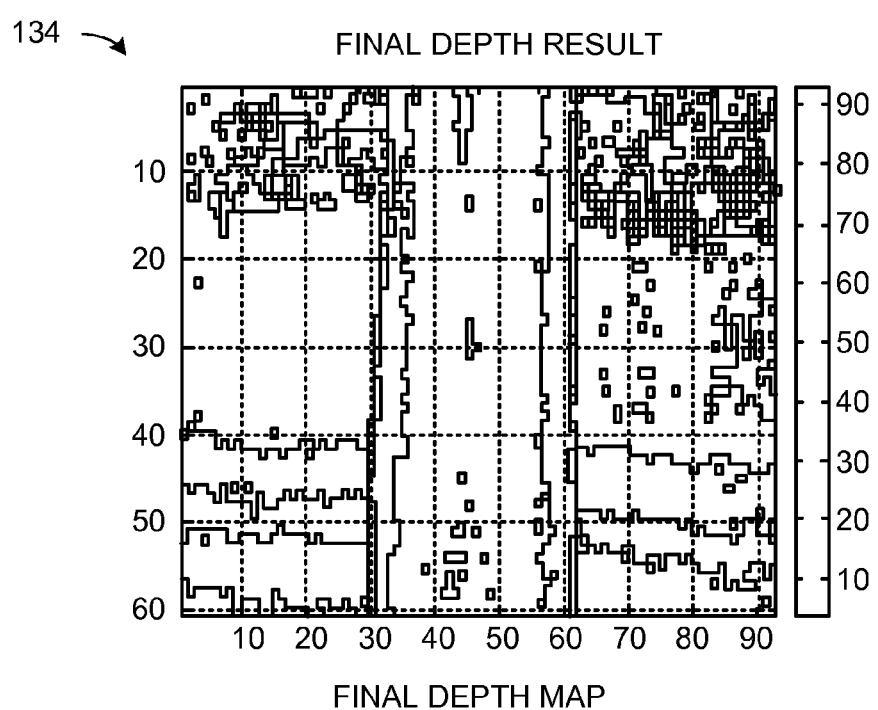
FIG. 18 is an example of the image depth map for the source image with varying depth.

Referring now to FIG. 18, therein is shown an example of the image depth map 134 for the source image 140 of FIG. 1 with varying depth. The image depth map 134 can show the region defined by the tree in the foreground having a consistent depth that is distinct from the element depth 306 of FIG. 3 of the regions of the received images 114 of FIG. 1 showing the more distant background.

Figure 19:
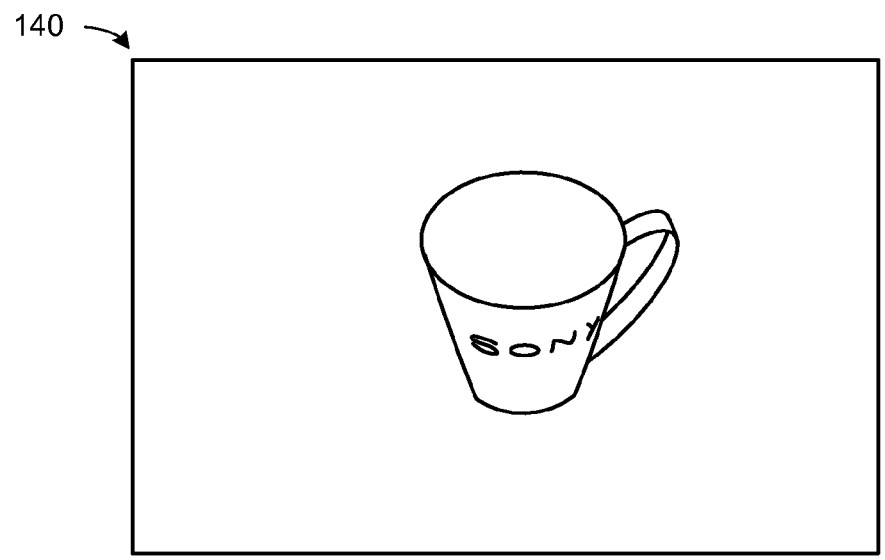
FIG. 19 is an example of the source image with low texture.

Referring now to FIG. 19, therein is shown an example of the source image 140 with low texture. The source image 140, such as a single cup on a similarly colored background, can have a variety of depth levels that may appear similar.

Figure 20:
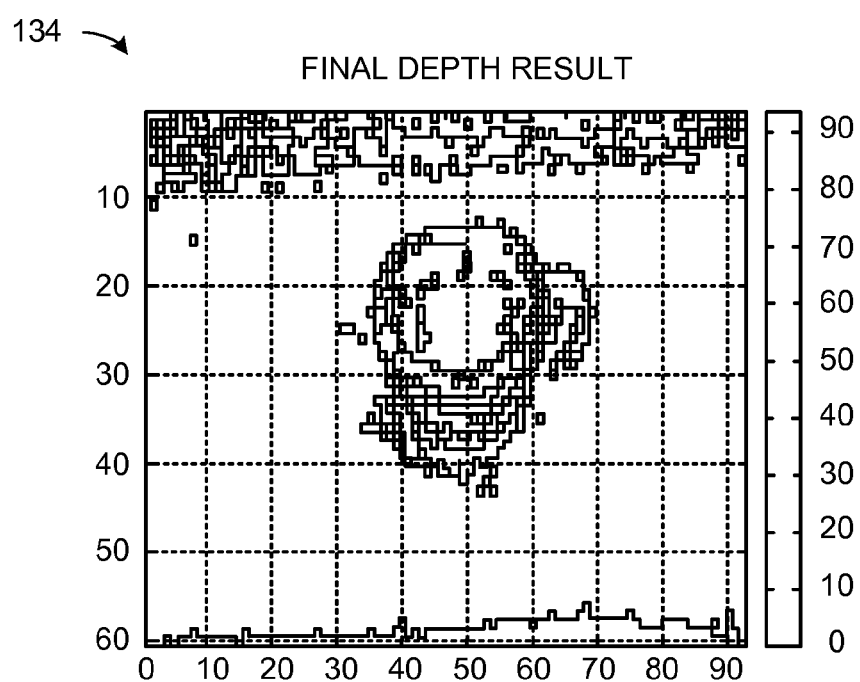
FIG. 20 is an example of the image depth map for the source image with low texture.

Referring now to FIG. 20, therein is shown an example of the image depth map 134 for the source image 140 of FIG. 1 with low texture. The image depth map 134 can show the element depth 306 of FIG. 3 for the grid blocks 302 of FIG. 3 of the received images 114 of FIG. 1 representing the cup, while the low texture background can have a range of the element depth 306.

Referring now to FIG. 21, therein is shown an example of a scene depth variance table. A scene depth variance table 2102 shows typical values for depth calculated by method mentioned in present invention, depth manually selected by naked eye, and the difference between the two methods.

Figure 22:
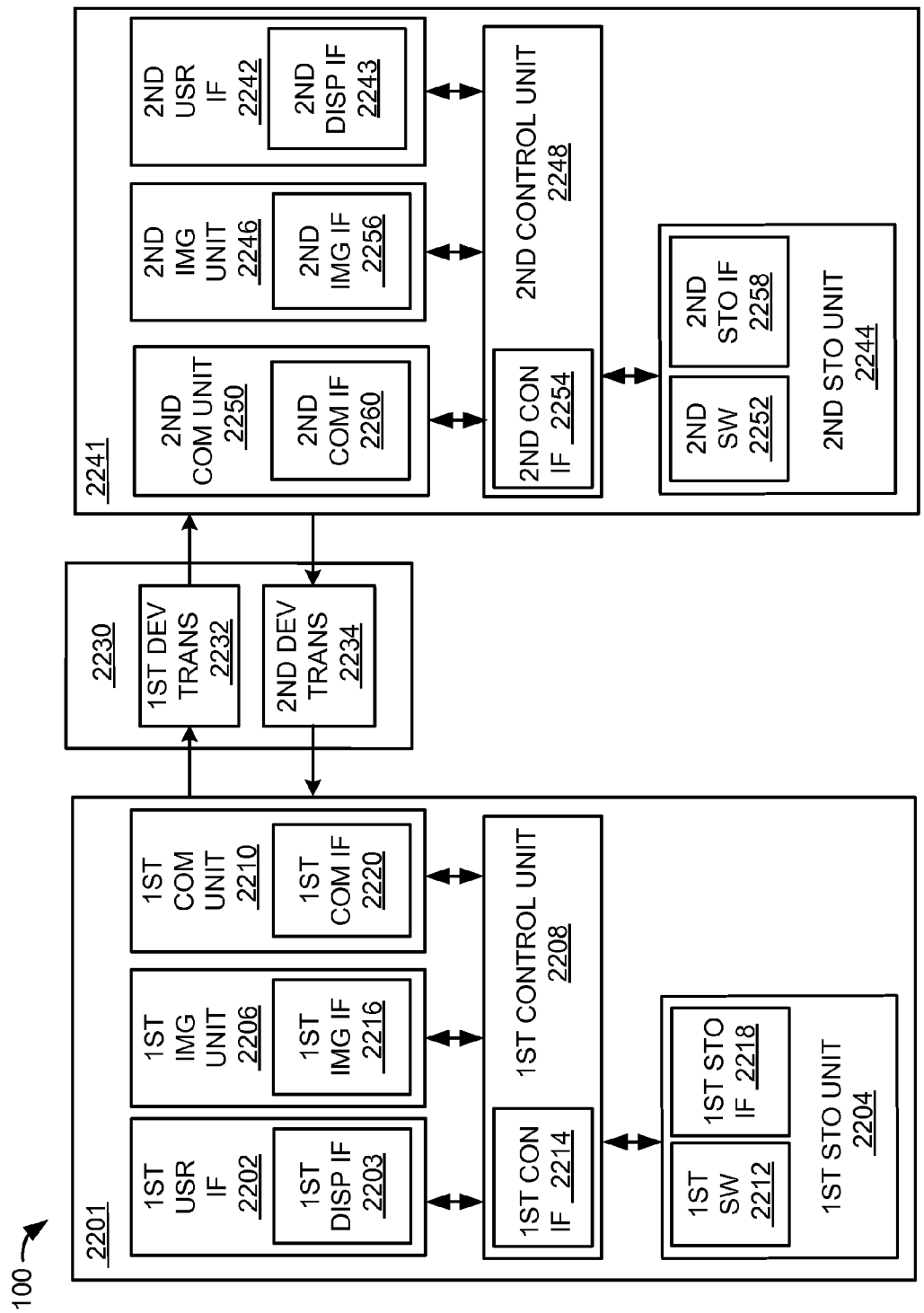
FIG. 22 is an example of a functional block diagram of the image processing system.

Referring now to FIG. 22, therein is shown an example of a functional block diagram of the image processing system 100. The image processing system 100 can include a first device 2201, a second device 2241 and a communication path 2230.

The image processing system 100 can be implemented using the first device 2201, the second device 2241, and the communication path 2230. For example, the first device 2201 can implement the imaging device 102 of FIG. 1, the second device 2241 can implement the display device 130 of FIG. 1, and the communication path 2230 can implement the communication link 132 of FIG. 1. However, it is understood that the image processing system 100 can be implemented in a variety of ways and the functionality of the imaging device 102, the display device 130, and the communication path 2230 can be partitioned differently over the first device 2201, the second device 2241, and the communication path 2230.

The first device 2201 can communicate with the second device 2241 over the communication path 2230. The first device 2201 can send information in a first device transmission 2232 over the communication path 2230 to the second device 2241. The second device 2241 can send information in a second device transmission 2234 over the communication path 2230 to the first device 2201.

For illustrative purposes, the image processing system 100 is shown with the first device 2201 as a client device, although it is understood that the image processing system 100 can have the first device 2201 as a different type of device. For example, the first device can be a server.

Also for illustrative purposes, the image processing system 100 is shown with the second device 2241 as a server, although it is understood that the image processing system 100 can have the second device 2241 as a different type of device. For example, the second device 2241 can be a client device.

For brevity of description in this embodiment of the present invention, the first device 2201 will be described as a client device, such as a video camera, smart phone, or a combination thereof. The present invention is not limited to this selection for the type of devices. The selection is an example of the present invention.

The first device 2201 can include a first control unit 2208. The first control unit 2208 can include a first control interface 2214. The first control unit 2208 can execute a first software 2212 to provide the intelligence of the image processing system 100.

The first control unit 2208 can be implemented in a number of different manners. For example, the first control unit 2208 can be a processor, an embedded processor, a microprocessor, a hardware control logic, a hardware finite state machine (FSM), a digital signal processor (DSP), or a combination thereof.

The first control interface 2214 can be used for communication between the first control unit 2208 and other functional units in the first device 2201. The first control interface 2214 can also be used for communication that is external to the first device 2201.

The first control interface 2214 can receive information from the other functional units or from external sources, or can transmit information to the other functional units or to external destinations. The external sources and the external destinations refer to sources and destinations external to the first device 2201.

The first control interface 2214 can be implemented in different ways and can include different implementations depending on which functional units or external units are being interfaced with the first control interface 2214. For example, the first control interface 2214 can be implemented with electrical circuitry, microelectromechanical systems (MEMS), optical circuitry, wireless circuitry, wireline circuitry, or a combination thereof.

The first device 2201 can include a first storage unit 2204. The first storage unit 2204 can store the first software 2212. The first storage unit 2204 can also store the relevant information, such as images, syntax information, videos, profiles, display preferences, sensor data, or any combination thereof.

The first storage unit 2204 can be a volatile memory, a nonvolatile memory, an internal memory, an external memory, or a combination thereof. For example, the first storage unit 2204 can be a nonvolatile storage such as non-volatile random access memory (NVRAM), Flash memory, disk storage, or a volatile storage such as static random access memory (SRAM).

The first storage unit 2204 can include a first storage interface 2218. The first storage interface 2218 can be used for communication between the first storage unit 2204 and other functional units in the first device 2201. The first storage interface 2218 can also be used for communication that is external to the first device 2201.

The first device 2201 can include a first imaging unit 2206. The first imaging unit 2206 can capture the first image 104 of FIG. 1 and the second image 106 of FIG. 1. The first imaging unit 2206 can include a digital camera, a video camera, an optical sensor, or any combination thereof.

The first imaging unit 2206 can include a first imaging interface 2216. The first imaging interface 2216 can be used for communication between the first imaging unit 2206 and other functional units in the first device 2201.

The first imaging interface 2216 can receive information from the other functional units or from external sources, or can transmit information to the other functional units or to external destinations. The external sources and the external destinations refer to sources and destinations external to the first device 2201.

The first imaging interface 2216 can include different implementations depending on which functional units or external units are being interfaced with the first imaging unit 2206. The first imaging interface 2216 can be implemented with technologies and techniques similar to the implementation of the first control interface 2214.

The first storage interface 2218 can receive information from the other functional units or from external sources, or can transmit information to the other functional units or to external destinations. The external sources and the external destinations refer to sources and destinations external to the first device 2201.

The first storage interface 2218 can include different implementations depending on which functional units or external units are being interfaced with the first storage unit 2204. The first storage interface 2218 can be implemented with technologies and techniques similar to the implementation of the first control interface 2214.

The first device 2201 can include a first communication unit 2210. The first communication unit 2210 can be for enabling external communication to and from the first device 2201. For example, the first communication unit 2210 can permit the first device 2201 to communicate with the second device 2241, an attachment, such as a peripheral device or a computer desktop, and the communication path 2230.

The first communication unit 2210 can also function as a communication hub allowing the first device 2201 to function as part of the communication path 2230 and not limited to be an end point or terminal unit to the communication path 2230. The first communication unit 2210 can include active and passive components, such as microelectronics or an antenna, for interaction with the communication path 2230.

The first communication unit 2210 can include a first communication interface 2220. The first communication interface 2220 can be used for communication between the first communication unit 2210 and other functional units in the first device 2201. The first communication interface 2220 can receive information from the other functional units or can transmit information to the other functional units.

The first communication interface 2220 can include different implementations depending on which functional units are being interfaced with the first communication unit 2210. The first communication interface 2220 can be implemented with technologies and techniques similar to the implementation of the first control interface 2214.

The first device 2201 can include a first user interface 2202. The first user interface 2202 allows a user (not shown) to interface and interact with the first device 2201. The first user interface 2202 can include a first user input (not shown). The first user input can include touch screen, gestures, motion detection, buttons, slicers, knobs, virtual buttons, voice recognition controls, or any combination thereof.

The first user interface 2202 can include the first display interface 2203. The first display interface 2203 can allow the user to interact with the first user interface 2202. The first display interface 2203 can include a display, a video screen, a speaker, or any combination thereof.

The first control unit 2208 can operate with the first user interface 2202 to display video information generated by the image processing system 100 on the first display interface 2203. The first control unit 2208 can also execute the first software 2212 for the other functions of the image processing system 100, including receiving image information from the first storage unit 2204 for display on the first display interface 2203. The first control unit 2208 can further execute the first software 2212 for interaction with the communication path 2230 via the first communication unit 2210.

For illustrative purposes, the first device 2201 can be partitioned having the first user interface 2202, the first storage unit 2204, the first control unit 2208, and the first communication unit 2210, although it is understood that the first device 2201 can have a different partition. For example, the first software 2212 can be partitioned differently such that some or all of its function can be in the first control unit 2208 and the first communication unit 2210. Also, the first device 2201 can include other functional units not shown in FIG. 17 for clarity.

The image processing system 100 can include the second device 2241. The second device 2241 can be optimized for implementing the present invention in a multiple device embodiment with the first device 2201. The second device 2241 can provide the additional or higher performance processing power compared to the first device 2201.

The second device 2241 can include a second control unit 2248. The second control unit 2248 can include a second control interface 2254. The second control unit 2248 can execute a second software 2252 to provide the intelligence of the image processing system 100.

The second control unit 2248 can be implemented in a number of different manners. For example, the second control unit 2248 can be a processor, an embedded processor, a microprocessor, a hardware control logic, a hardware finite state machine (FSM), a digital signal processor (DSP), or a combination thereof.

The second control interface 2254 can be used for communication between the second control unit 2248 and other functional units in the second device 2241. The second control interface 2254 can also be used for communication that is external to the second device 2241.

The second control interface 2254 can receive information from the other functional units or from external sources, or can transmit information to the other functional units or to external destinations. The external sources and the external destinations refer to sources and destinations external to the second device 2241.

The second control interface 2254 can be implemented in different ways and can include different implementations depending on which functional units or external units are being interfaced with the second control interface 2254. For example, the second control interface 2254 can be implemented with electrical circuitry, microelectromechanical systems (MEMS), optical circuitry, wireless circuitry, wireline circuitry, or a combination thereof.

The second device 2241 can include a second storage unit 2244. The second storage unit 2244 can store the second software 2252. The second storage unit 2244 can also store the relevant information, such as images, syntax information, video, profiles, display preferences, sensor data, or any combination thereof.

The second storage unit 2244 can be a volatile memory, a nonvolatile memory, an internal memory, an external memory, or a combination thereof. For example, the second storage unit 2244 can be a nonvolatile storage such as non-volatile random access memory (NVRAM), Flash memory, disk storage, or a volatile storage such as static random access memory (SRAM).

The second storage unit 2244 can include a second storage interface 2258. The second storage interface 2258 can be used for communication between the second storage unit 2244 and other functional units in the second device 2241. The second storage interface 2258 can also be used for communication that is external to the second device 2241.

The second storage interface 2258 can receive information from the other functional units or from external sources, or can transmit information to the other functional units or to external destinations. The external sources and the external destinations refer to sources and destinations external to the second device 2241.

The second storage interface 2258 can include different implementations depending on which functional units or external units are being interfaced with the second storage unit 2244. The second storage interface 2258 can be implemented with technologies and techniques similar to the implementation of the second control interface 2254.

The second device 2241 can include a second imaging unit 2246. The second imaging unit 2246 can capture the first image 104 from the real world. The first imaging unit 2206 can include a digital camera, a video camera, an optical sensor, or any combination thereof.

The second imaging unit 2246 can include a second imaging interface 2256. The second imaging interface 2256 can be used for communication between the second imaging unit 2246 and other functional units in the second device 2241.

The second imaging interface 2256 can receive information from the other functional units or from external sources, or can transmit information to the other functional units or to external destinations. The external sources and the external destinations refer to sources and destinations external to the second device 2241.

The second imaging interface 2256 can include different implementations depending on which functional units or external units are being interfaced with the second imaging unit 2246. The second imaging interface 2256 can be implemented with technologies and techniques similar to the implementation of the first control interface 2214.

The second device 2241 can include a second communication unit 2250. The second communication unit 2250 can enable external communication to and from the second device 2241. For example, the second communication unit 2250 can permit the second device 2241 to communicate with the first device 2201, an attachment, such as a peripheral device or a computer desktop, and the communication path 2230.

The second communication unit 2250 can also function as a communication hub allowing the second device 2241 to function as part of the communication path 2230 and not limited to be an end point or terminal unit to the communication path 2230. The second communication unit 2250 can include active and passive components, such as microelectronics or an antenna, for interaction with the communication path 2230.

The second communication unit 2250 can include a second communication interface 2260. The second communication interface 2260 can be used for communication between the second communication unit 2250 and other functional units in the second device 2241. The second communication interface 2260 can receive information from the other functional units or can transmit information to the other functional units.

The second communication interface 2260 can include different implementations depending on which functional units are being interfaced with the second communication unit 2250. The second communication interface 2260 can be implemented with technologies and techniques similar to the implementation of the second control interface 2254.

The second device 2241 can include a second user interface 2242. The second user interface 2242 allows a user (not shown) to interface and interact with the second device 2241. The second user interface 2242 can include a second user input (not shown). The second user input can include touch screen, gestures, motion detection, buttons, slicers, knobs, virtual buttons, voice recognition controls, or any combination thereof.

The second user interface 2242 can include a second display interface 2243. The second display interface 2243 can allow the user to interact with the second user interface 2242. The second display interface 2243 can include a display, a video screen, a speaker, or any combination thereof.

The second control unit 2248 can operate with the second user interface 2242 to display information generated by the image processing system 100 on the second display interface 2243. The second control unit 2248 can also execute the second software 2252 for the other functions of the image processing system 100, including receiving display information from the second storage unit 2244 for display on the second display interface 2243. The second control unit 2248 can further execute the second software 2252 for interaction with the communication path 2230 via the second communication unit 2250.

For illustrative purposes, the second device 2241 can be partitioned having the second user interface 2242, the second storage unit 2244, the second control unit 2248, and the second communication unit 2250, although it is understood that the second device 2241 can have a different partition. For example, the second software 2252 can be partitioned differently such that some or all of its function can be in the second control unit 2248 and the second communication unit 2250. Also, the second device 2241 can include other functional units not shown in FIG. 17 for clarity.

The first communication unit 2210 can couple with the communication path 2230 to send information to the second device 2241 in the first device transmission 2232. The second device 2241 can receive information in the second communication unit 2250 from the first device transmission 2232 of the communication path 2230.

The second communication unit 2250 can couple with the communication path 2230 to send image information to the first device 2201 in the second device transmission 2234. The first device 2201 can receive image information in the first communication unit 2210 from the second device transmission 2234 of the communication path 2230. The image processing system 100 can be executed by the first control unit 2208, the second control unit 2248, or a combination thereof.

The functional units in the first device 2201 can work individually and independently of the other functional units. For illustrative purposes, the image processing system 100 is described by operation of the first device 2201. It is understood that the first device 2201 can operate any of the modules and functions of the image processing system 100. For example, the first device 2201 can be described to operate the first control unit 2208.

The functional units in the second device 2241 can work individually and independently of the other functional units. For illustrative purposes, the image processing system 100 can be described by operation of the second device 2241. It is understood that the second device 2241 can operate any of the modules and functions of the image processing system 100. For example, the second device 2241 is described to operate the second control unit 2248.

For illustrative purposes, the image processing system 100 is described by operation of the first device 2201 and the second device 2241. It is understood that the first device 2201 and the second device 2241 can operate any of the modules and functions of the image processing system 100. For example, the first device 2201 is described to operate the first control unit 2208, although it is understood that the second device 2241 can also operate the first control unit 2208.

The physical transformation from the images of physical objects of the source image 140 of FIG. 1 to displaying the images on the pixel elements of the display device 130 results in physical changes to the pixel elements of the display device 130 in the physical world, such as the change of electrical state the pixel element, is based on the operation of the image processing system 100. As the changes in the physical world occurs, such as the motion of the imaging sensor used to capture the source image 140, the movement itself creates additional information, such as the updates to the first image 104, that are converted back into changes in the pixel elements of the display device 130 for continued operation of the image processing system 100.

The first software 2212 of the first device 2201 can implement portions of the image processing system 100. For example, the first software 2212 can include the capture image sequence module 1304 of FIG. 13, the calculate iteration depth map module 1306 of FIG. 13, the calculate zero-crossing module 1310 of FIG. 13, the calculate variance depth map module 1312 of FIG. 13, the calculate median depth map module 1318 of FIG. 13, and the calculate image depth map module 1320 of FIG. 13.

The first control unit 2208 can execute the first software 2212 to execute the capture image sequence module 1304 to receive the image sequence 144 of FIG. 1. The first control unit 2208 can execute the first software 2212 to execute the calculate iteration depth map module 1306 to calculate the iteration depth map 1324 of FIG. 13. The first control unit 2208 can execute the first software 2212 to execute the calculate zero-crossing module 1310 to calculate the zero-crossing array 910 of FIG. 9. The first control unit 2208 can execute the first software 2212 to execute the calculate variance depth map module 1312 to calculate the variance depth map 1328 of FIG. 13. The first control unit 2208 can execute the first software 2212 to execute the calculate median depth map module 1318 to calculate the median depth map 1334 of FIG. 13. The first control unit 2208 can execute the first software 2212 to execute the calculate image depth map module 1320 to calculate the image depth map 134 of FIG. 1.

The second software 2252 of the second device 2241 can implement portions of the image processing system 100. For example, the second software 2252 can include the capture image sequence module 1304, the calculate iteration depth map module 1306, the calculate zero-crossing module 1310, the calculate variance depth map module 1312, the calculate median depth map module 1318, and the calculate image depth map module 1320.

The second control unit 2248 can execute the second software 2252 to execute the capture image sequence module 1304 to receive the image sequence 144. The second control unit 2248 can execute the second software 2252 to execute the calculate iteration depth map module 1306 to calculate the iteration depth map 1324. The second control unit 2248 can execute the second software 2252 to execute the calculate zero-crossing module 1310 to calculate the zero-crossing array 910. The second control unit 2248 can execute the second software 2252 to execute the calculate variance depth map module 1312 to calculate the variance depth map 1328. The second control unit 2248 can execute the second software 2252 to execute the calculate median depth map module 1318 to calculate the median depth map 1334. The second control unit 2248 can execute the second software 2252 to execute the calculate image depth map module 1320 to calculate the image depth map 134.

The image processing system 100 can be partitioned between the first software 2212 and the second software 2252. For example, the first software 2212 can include the capture image sequence module 1304, the calculate iteration depth map module 1306, and the calculate zero-crossing module 1310. The second software 2252 can include the calculate variance depth map module 1312, the calculate median depth map module 1318, and the calculate image depth map module 1320. The first control unit 2208 can execute the modules partitioned to the first software 2212. The second control unit 2248 can execute modules partitioned to the second software 2252.

The image processing system 100 describes the module functions or order as an example. Each of the modules can operate individually and independently of the other modules. The modules can be partitioned differently. For example, the calculate iteration depth map module 1306 and the calculate zero-crossing module 1310 can be combined.

Furthermore, data generated in one module can be used by another module without being directly coupled to each other. For example, the calculate iteration depth map module 1306, the calculate zero-crossing module 1310, the calculate variance depth map module 1312, the calculate median depth map module 1318, and the calculate image depth map module 1320 can receive the image sequence 144 from the capture image sequence module 1304.

The modules can be implemented in a variety of ways. The capture image sequence module 1304, the calculate iteration depth map module 1306, the calculate zero-crossing module 1310, the calculate variance depth map module 1312, the calculate median depth map module 1318, and the calculate image depth map module 1320 can be implemented in hardware accelerators (not shown) within the first control unit 2208 or the second control unit 2248, or can be implemented in hardware accelerators (not shown) in the first device 2201 or the second device 2241 outside of the first control unit 2208 or the second control unit 2248.

Figure 23:
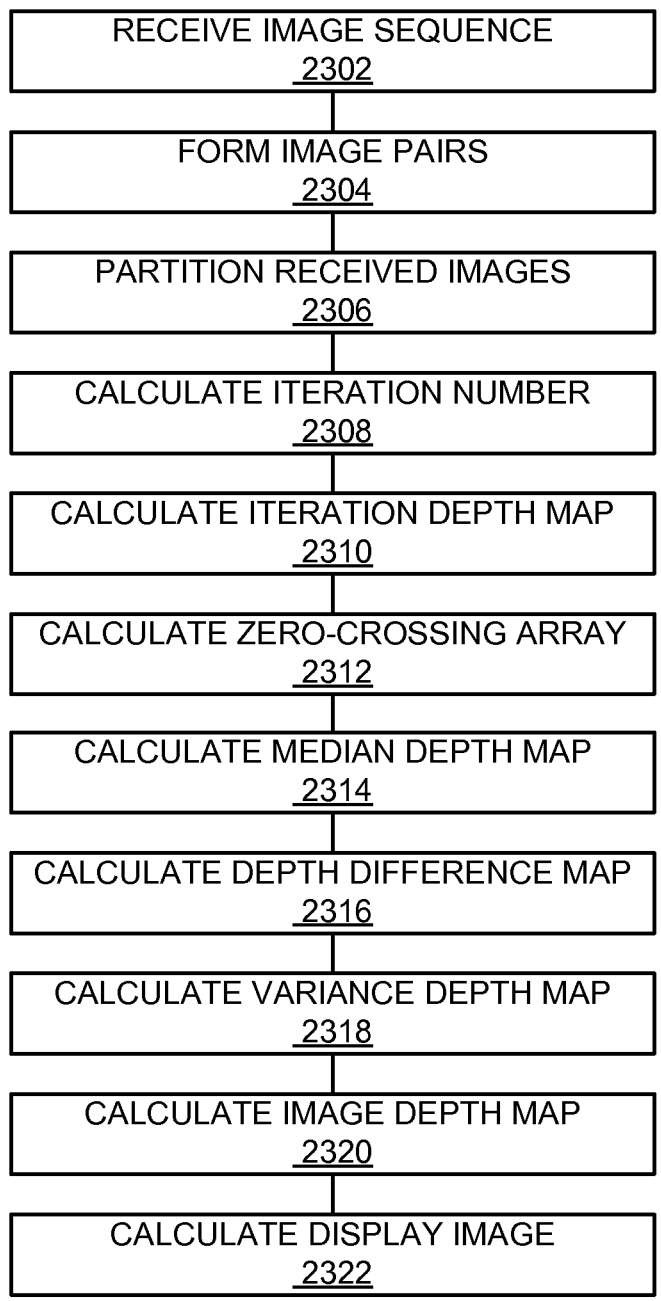
FIG. 23 is a flow chart of a method of operation of the image processing system in a further embodiment of the present invention.

Referring now to FIG. 23, therein is shown a flow chart of a method 2300 of operation of the imaging system in a further embodiment of the present invention. The method 2300 includes: receiving an image sequence having received images each having a lens position in a block 2302; forming image pairs having a first image and a second image, the image pairs of the received images in consecutive order for the lens position in a block 2304; partitioning the received images into a grid array having grid blocks in a block 2306; calculating an iteration number for the blur difference between each of the image pairs of the image sequence, the iteration number calculated by iteratively convoluting the second image with a blur kernel until the blur metric of the second image is within a blur difference threshold of the blur metric of the first image in a block 2308; calculating an iteration depth map having an iteration depth for each of the grid blocks of the received images, the iteration depth based on a zero-crossing point for the iteration number in a block 2310; calculating a zero-crossing array having a zero-crossing depth for each of the grid blocks of the image sequence in a block 2312; calculating a median depth map having a median depth for each of the grid blocks by applying a median filter to the iteration depth map in a block 2314; calculating a depth difference map by subtracting the median depth map from the iteration depth map in a block 2316; calculating a variance depth map having a block variance for each of the grid blocks of the received images in a block 2318; calculating an image depth map having an element depth assigned to each of the grid blocks, the element depth based on the iteration depth map, the zero-crossing array, the median depth map, the depth difference map, and the variance depth map in a block 2320; and calculating a display image based on the received images and the image depth map for displaying on a display device in a block 2322.

It has been discovered that the present invention thus has numerous aspects. The present invention valuably supports and services the historical trend of reducing costs, simplifying systems, and increasing performance. These and other valuable aspects of the present invention consequently further the state of the technology to at least the next level.

Thus, it has been discovered that the image processing system of the present invention furnishes important and heretofore unknown and unavailable solutions, capabilities, and functional aspects for processing image content. The resulting processes and configurations are straightforward, cost-effective, uncomplicated, highly versatile and effective, can be surprisingly and unobviously implemented by adapting known technologies, and are thus readily suited for efficiently and economically manufacturing video coding devices fully compatible with conventional manufacturing processes and technologies. The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an image processing system comprising:
   receiving an image sequence having received images each having a lens position;
   forming image pairs having a first image and a second image, the image pairs of the received images in consecutive order for the lens position;
   partitioning the received images into a grid array having grid blocks;
   calculating an iteration number for the blur difference between each of the image pairs of the image sequence, the iteration number calculated by iteratively convoluting the second image with a blur kernel until the blur metric of the second image is within a blur difference threshold of the blur metric of the first image;
   calculating an iteration depth map having an iteration depth for each of the grid blocks of the received images, the iteration depth based on a zero-crossing point for the iteration number;
   calculating a zero-crossing array having a zero-crossing depth for each of the grid blocks of the image sequence;
   calculating a median depth map having a median depth for each of the grid blocks by applying a median filter to the iteration depth map;
   calculating a depth difference map by subtracting the median depth map from the iteration depth map;
   calculating a variance depth map having a block variance for each of the grid blocks of the received images;
   calculating an image depth map having an element depth assigned to each of the grid blocks, the element depth based on the iteration depth map, the zero-crossing array, the median depth map, the depth difference map, and the variance depth map; and
   applying the image depth map to the received images by calculating a display image based on the received images and the image depth map for displaying on a display device.

2. The method as claimed in claim 1, wherein calculating the image depth map includes setting the element depth to the iteration depth if the depth difference is below the depth threshold.

3. The method as claimed in claim 1, wherein calculating the image depth map includes setting the element depth to the depth of the zero-crossing point if the depth difference is greater than or equal to a depth threshold and the zero-crossing point exists in a range of +/−1 depth of field for the selected one of the grid blocks.

4. The method as claimed in claim 1, wherein calculating the image depth map includes setting the element depth to the variance peak if the depth difference is greater than or equal to the depth threshold and the zero-crossing point does not exist in a range of +/−1 depth of field for the selected one of the grid blocks and the variance peak exists for the selected one of the grid blocks.

5. The method as claimed in claim 1, wherein calculating the image depth map includes setting the element depth to the iteration depth if the depth difference is greater than or equal to the depth threshold and the zero-crossing point does not exist in a range of +/−1 depth of field for the selected one of the grid blocks, and the variance peak does not exist in the a range of +/−2 depth of field for the selected one of the grid blocks.

6. A method of operation of an image processing system comprising:
   receiving an image sequence having received images each having a lens position, the lens position sequentially increasing between each of the received images;
   forming image pairs having a first image and a second image, the image pairs of the received images in consecutive order for the lens position;
   partitioning the received images into a grid array having grid blocks, the grid blocks having a target block;
   calculating an iteration number for the blur difference between each of the image pairs of the image sequence, the iteration number calculated by iteratively convoluting the second image with a blur kernel until the blur metric of the second image is within a blur difference threshold of the blur metric of the first image;
   calculating an iteration depth map having an iteration depth for each of the grid blocks of the received images, and the iteration depth based on a zero-crossing point for the iteration number;
   calculating a zero-crossing array for each of the grid blocks of the image sequence;
   calculating a median depth map having a median depth for each of the grid blocks by applying a median filter to the iteration depth map;

calculating a depth difference map by subtracting the median depth map from the iteration depth map;

calculating a variance map having a block variance for each of the grid blocks of the received images;

calculating an image depth map having an element depth assigned to each of the grid blocks, the element depth based on the iteration depth map, the zero-crossing array, the median depth map, and the variance depth map; and applying the image depth map to the received images by calculating a display image based on the received images and the image depth map for displaying on a display device.

7. The method as claimed in claim 6, further comprising:
calculating an iteration depth for the target block based on the iteration number of image pairs of the image sequence; and wherein the iteration depth is calculated based on the zero-crossing point of a fitting curve formed using a window fitting operation applied to the iteration number for the image sequence.

8. The method as claimed in claim 6, further comprising calculating a variance peak depth as the maximum of the block variance for corresponding blocks of the image sequence.

9. The method as claimed in claim 6, further comprising calculating a zero crossing array of the target block.

10. The method as claimed in claim 6, further comprising calculating the median depth of the target block by applying the median filter to the iteration depth map.

11. An image processing system comprising:
a capture image sequence module for receiving an image sequence having received images each having a lens position and for forming image pairs having a first image, a second image, the image pairs of the received images in consecutive order for the lens position, and for partitioning the received images into a grid array having grid blocks;

a calculate iteration depth map module, coupled to the capture image sequence module, for calculating an iteration number for the blur difference between each of the image pairs of the image sequence, the iteration number calculated by iteratively convoluting the second image with a blur kernel until the blur metric of the second image is within a blur difference threshold of the blur metric of the first image, and for calculating an iteration depth map having an iteration depth for each of the grid blocks of the received images, the iteration depth based on a zero-crossing point for the iteration number, and for calculating a zero-crossing array having a zero-crossing depth for each of the grid blocks of the image sequence;

a calculate median depth map module, coupled to the calculate iteration depth map module, for calculating a median depth map having a median depth for each of the grid blocks by applying a median filter to the iteration depth map and for calculating a depth difference map by subtracting the median depth map from the iteration depth map;

a calculate variance depth map module, coupled to the calculate median depth map module, for calculating a variance depth map having a block variance for each of the grid blocks of the received images;

a calculate image depth map module, coupled to the calculate variance depth map module, for calculating an image depth map having an element depth assigned to each of the grid blocks, the element depth based on the iteration depth map, the zero-crossing array, the median depth map, the depth difference map, and the variance depth map; and a calculate display image module, coupled to the calculate image depth map module for applying the image depth map to the received images by calculating a display image based on the received images and the image depth map for displaying on a display device.

12. The system as claimed in claim 11, wherein the calculate image depth map module is for setting the element depth to the iteration depth if the depth difference is below the depth threshold.

13. The system as claimed in claim 11, wherein the calculate image depth map module is for setting the element depth to the depth of the zero-crossing point if the depth difference is greater than or equal to the depth threshold and the zero-crossing point exists in a range of +/−1 depth of field for the selected one of the grid blocks.

14. The system as claimed in claim 11, wherein the calculate image depth map module is for setting the element depth to the variance peak if the depth difference is greater than or equal to the depth threshold and the zero-crossing point does not exist in a range of +/−1 depth of field for the selected one of the grid blocks and the variance peak exists for the selected one of the grid blocks.

15. The system as claimed in claim 11, wherein the calculate image depth map module is for setting the element depth to the iteration depth if the depth difference is greater than or equal to the depth threshold and the zero-crossing point does not exist in a range of +/−1 depth of field for the selected one of the grid blocks, and the variance peak does not exist in a range of +/−2 depth of field for the selected one of the grid blocks.

16. The system as claimed in claim 11, wherein the capture image sequence module is for receiving an image sequence 144 with the lens position sequentially increasing between each of the received images and for partitioning the received images into grid blocks having a target block.

17. The system as claimed in claim 16, wherein the calculate iteration depth map module is for calculating an iteration depth for the target block based on the iteration number of image pairs of the image sequence; and the iteration depth is calculated based on the zero crossing point of a fitting curve formed using a window fitting operation applied to the iteration number for the image sequence.

18. The system as claimed in claim 16, wherein the calculate variance depth map module is for calculating a variance peak depth as the maximum of the block variance for corresponding blocks of the image sequence.

19. The system as claimed in claim 16, wherein the calculate iteration depth map module is for calculating a zero-crossing array of the target block.

20. The system as claimed in claim 16, wherein the calculate median depth map module is for calculating the median depth of the target block by applying the median filter to the iteration depth map.

* * * * *